(12) United States Patent
Bai et al.

(10) Patent No.: US 12,615,127 B2
(45) Date of Patent: Apr. 28, 2026

(54) TCI AND PATH LOSS REFERENCE SIGNAL PRE-CONFIGURATION FOR CANDIDATE CELLS

(71) Applicant: QUALCOMM Incorporated, San Diego, CA (US)

(72) Inventors: Tianyang Bai, Somerville, NJ (US); Yan Zhou, San Diego, CA (US); Jelena Damnjanovic, Del Mar, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 18/464,802

(22) Filed: Sep. 11, 2023

(65) Prior Publication Data

US 2024/0146487 A1 May 2, 2024

Related U.S. Application Data

(60) Provisional application No. 63/381,548, filed on Oct. 28, 2022.

(51) Int. Cl.
*H04L 5/00* (2006.01)

(52) U.S. Cl.
CPC ................................. *H04L 5/0091* (2013.01)

(58) Field of Classification Search
CPC ...................................................... H04L 5/0091
See application file for complete search history.

(56) References Cited

U.S. PATENT DOCUMENTS

2023/0354117 A1* 11/2023 Yuan ................. H04W 36/0094

FOREIGN PATENT DOCUMENTS

| EP | 4258739 A1 | 10/2023 |
| WO | 2022133821 A1 | 6/2022 |
| WO | 2022222016 A1 | 10/2022 |

OTHER PUBLICATIONS

Moderator (Fujitsu), "FL summary 3 on L1 enhancements for inter-cell beam management", 3GPP TSG RAN WG1 Meeting #110bis-e, e-meeting, Oct. 10-19, 2022, R1-2210675 (Year: 2022).*
Nokia et al., "Discussion on L1 enhancements for L1/L2 based inter-cell mobility" 3GPP TSG RAN WG1 #110bis, e-meeting, Oct. 10-19, 2022, R1-2208500 (Year: 2022).*
(Continued)

*Primary Examiner* — Joseph A Bednash
(74) *Attorney, Agent, or Firm* — Procopio, Cory, Hargreaves & Savitch LLP

(57) ABSTRACT

The apparatus may be a UE configured to receive, from a network node, a switch indication for the UE to switch from being served by a first cell to being served by a second cell. The apparatus may further be configured to receive a transmission configuration indication (TCI) state indication that indicates a TCI state for the UE to use with the second cell, where a first time period between the switch indication and the TCI state indication is based on a relationship of the TCI state to one or more reference signals measured by the UE prior to receiving the switch indication. The apparatus may also be configured to communicate with the network node via the second cell and using the TCI state.

30 Claims, 14 Drawing Sheets

(56) References Cited

OTHER PUBLICATIONS

Fujitsu, "Views on L1 enhancements for inter-cell beam management", 3GPP TSG RAN WG1 Meeting #110bis-e, e-meeting, Oct. 10-19, 2022, R1-2209024 (Year: 2022).*

International Search Report and Written Opinion—PCT/US2023/032554—ISA/EPO—Dec. 21, 2023.

Moderator (Fujitsu): "FL Summary 3 on L1 Enhancements for Inter-cell Beam Management", R1-2210675, 3GPP TSG RAN WG1 Meeting #110bis-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 10, 2022-Oct. 19, 2022, Oct. 20, 2022, 127 Pages, XP052260139, p. 108, last section, p. 104, lines 5-11 of Section 5.4.

* cited by examiner

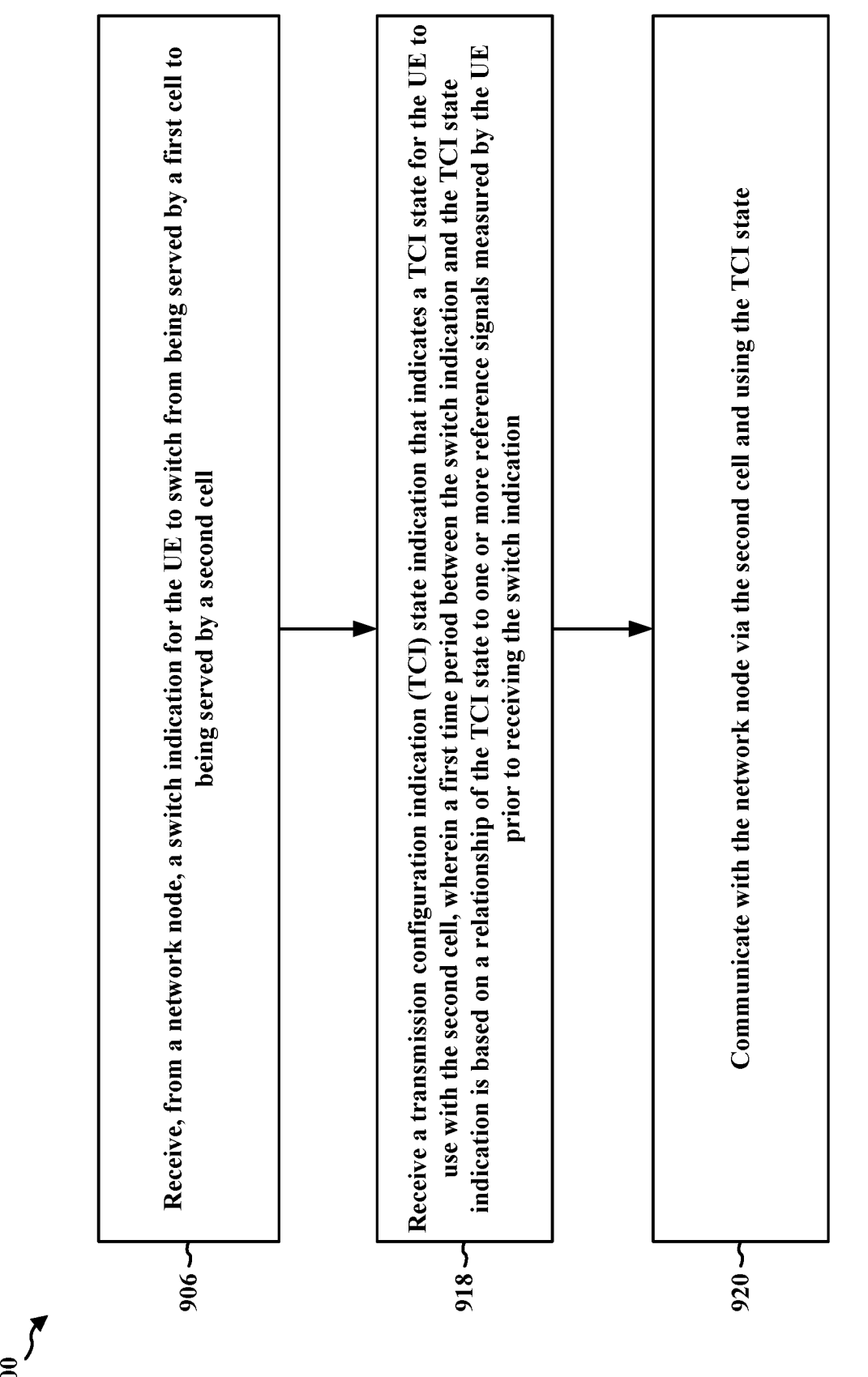

Receive, from a network node, a switch indication for the UE to switch from being served by a first cell to being served by a second cell

906

Receive a transmission configuration indication (TCI) state indication that indicates a TCI state for the UE to use with the second cell, wherein a first time period between the switch indication and the TCI state indication is based on a relationship of the TCI state to one or more reference signals measured by the UE prior to receiving the switch indication

918

Communicate with the network node via the second cell and using the TCI state

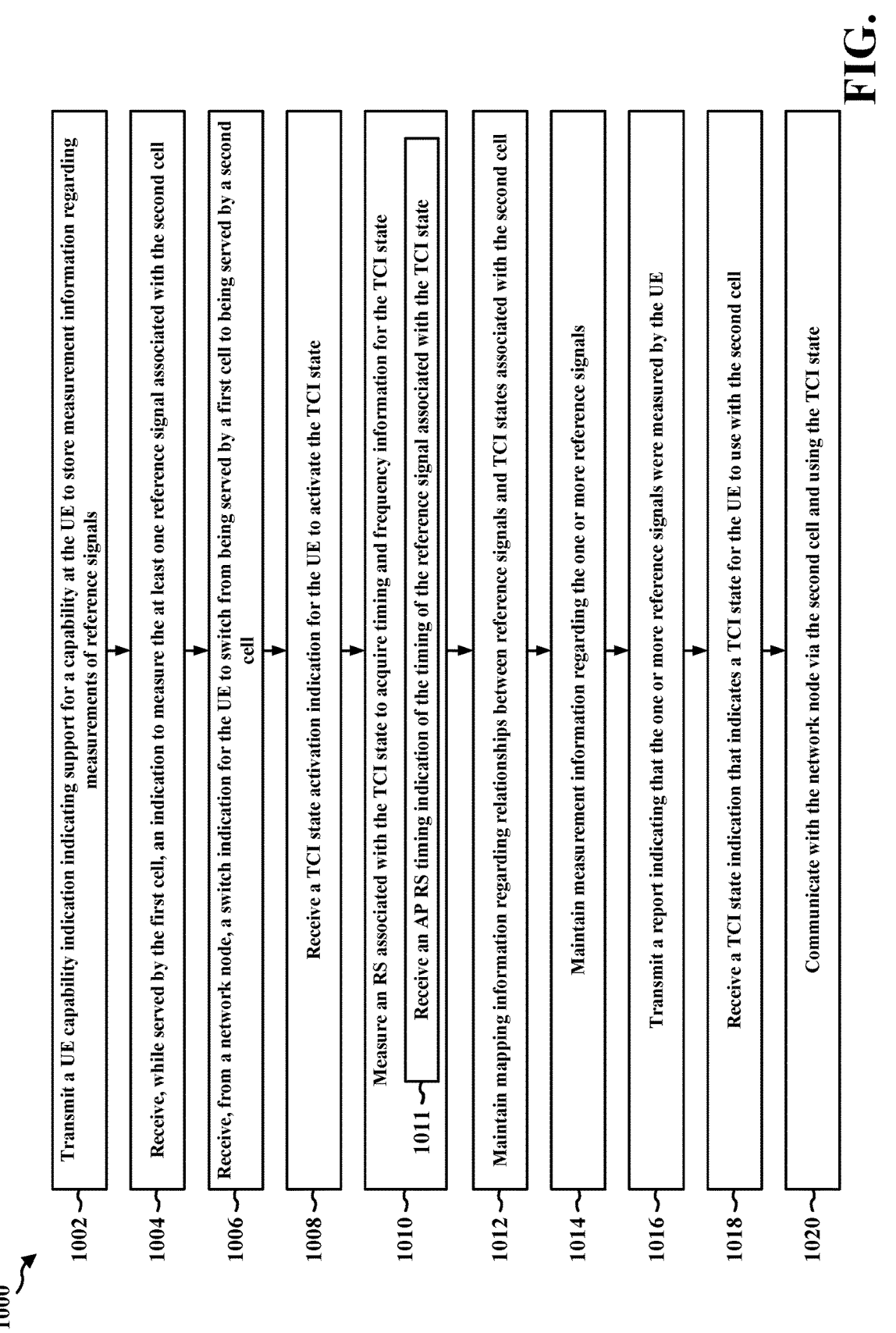

1002 — Transmit a UE capability indication indicating support for a capability at the UE to store measurement information regarding measurements of reference signals 1004 — Receive, while served by the first cell, an indication to measure the at least one reference signal associated with the second cell 1006 — Receive, from a network node, a switch indication for the UE to switch from being served by a first cell to being served by a second cell 1008 — Receive a TCI state activation indication for the UE to activate the TCI state 1010 — Measure an RS associated with the TCI state to acquire timing and frequency information for the TCI state 1011 — Receive an AP RS timing indication of the timing of the reference signal associated with the TCI state 1012 — Maintain mapping information regarding relationships between reference signals and TCI states associated with the second cell 1014 — Maintain measurement information regarding the one or more reference signals 1016 — Transmit a report indicating that the one or more reference signals were measured by the UE 1018 — Receive a TCI state indication that indicates a TCI state for the UE to use with the second cell 1020 — Communicate with the network node via the second cell and using the TCI state

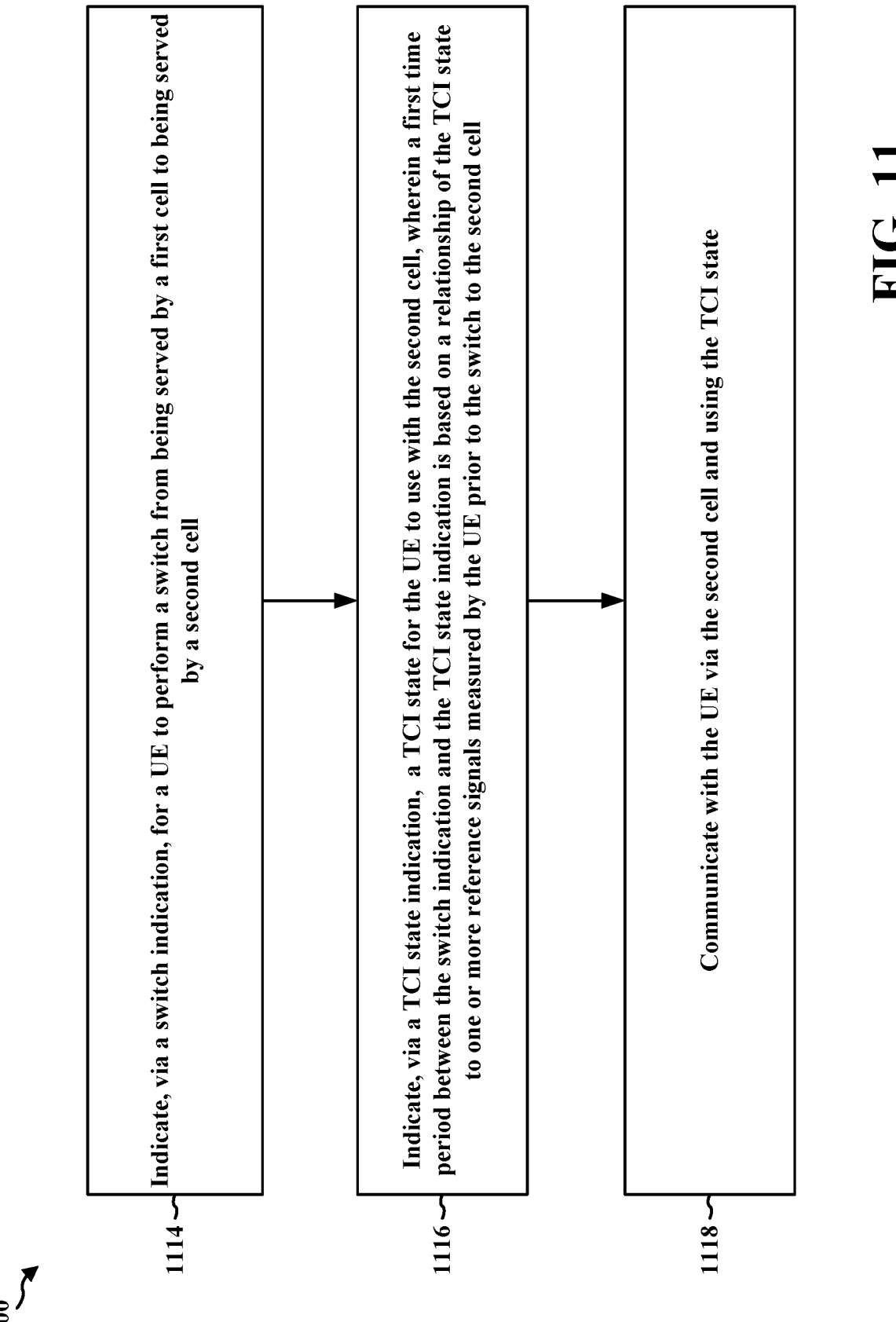

1100

1114   Indicate, via a switch indication, for a UE to perform a switch from being served by a first cell to being served by a second cell 1116   Indicate, via a TCI state indication, a TCI state for the UE to use with the second cell, wherein a first time period between the switch indication and the TCI state indication is based on a relationship of the TCI state to one or more reference signals measured by the UE prior to the switch to the second cell 1118   Communicate with the UE via the second cell and using the TCI state

FIG. 11

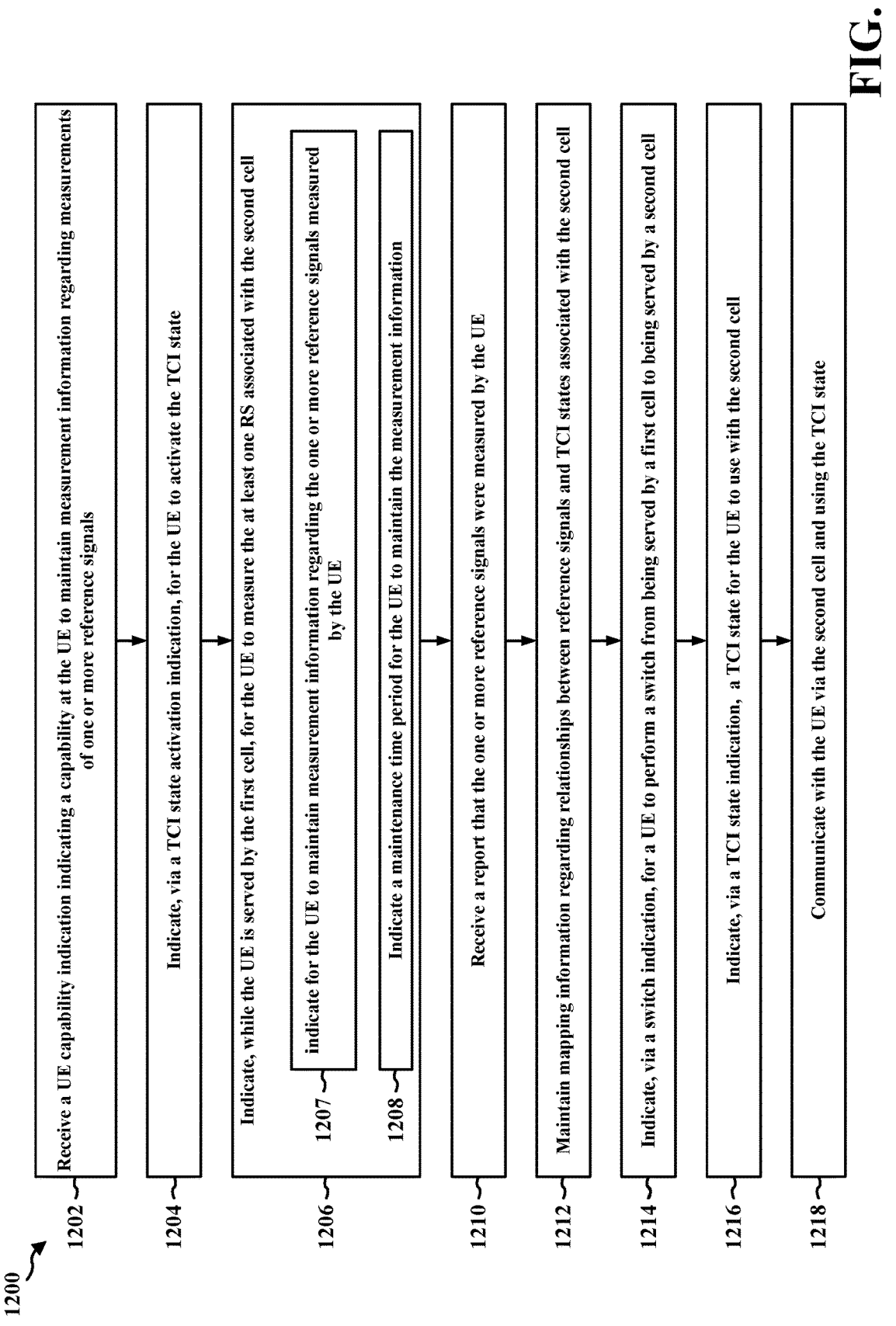

1202 — Receive a UE capability indication indicating a capability at the UE to maintain measurement information regarding measurements of one or more reference signals 1204 — Indicate, via a TCI state activation indication, for the UE to activate the TCI state 1206 — Indicate, while the UE is served by the first cell, for the UE to measure the at least one RS associated with the second cell 1207 — indicate for the UE to maintain measurement information regarding the one or more reference signals measured by the UE 1208 — Indicate a maintenance time period for the UE to maintain the measurement information 1210 — Receive a report that the one or more reference signals were measured by the UE 1212 — Maintain mapping information regarding relationships between reference signals and TCI states associated with the second cell 1214 — Indicate, via a switch indication, for a UE to perform a switch from being served by a first cell to being served by a second cell 1216 — Indicate, via a TCI state indication, a TCI state for the UE to use with the second cell 1218 — Communicate with the UE via the second cell and using the TCI state

TCI AND PATH LOSS REFERENCE SIGNAL PRE-CONFIGURATION FOR CANDIDATE CELLS

CROSS REFERENCE TO RELATED APPLICATION(S)

This application claims the benefit of and priority to U.S. Provisional Application Ser. No. 63/381,548, entitled "TCI AND PATH LOSS REFERENCE SIGNAL PRE-CONFIGURATION FOR CANDIDATE CELLS" and filed on Oct. 28, 2022, which is expressly incorporated by reference herein in its entirety.

TECHNICAL FIELD

The present disclosure relates generally to communication systems, and more particularly, to layer 1 and/or layer 2 mediated cell mobility.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to receive, from a network node, a switch indication for the UE to switch from being served by a first cell to being served by a second cell. The apparatus may further be configured to receive a transmission configuration indication (TCI) state indication that indicates a TCI state for the UE to use with the second cell, where a first time period between the switch indication and the TCI state indication is based on a relationship of the TCI state to one or more reference signals measured by the UE prior to receiving the switch indication. The apparatus may also be configured to communicate with the network node via the second cell and using the TCI state.

In an aspect of the disclosure, a method, a computer-readable medium, and an apparatus are provided. The apparatus may be configured indicate, via a switch indication, for a UE to switch from being served by a first cell to being served by a second cell. The apparatus may further be configured indicate, via a TCI state indication, a TCI state for the UE to use with the second cell, where a first time period between the switch indication and the TCI state indication is based on a relationship of the TCI state to one or more reference signals measured by the UE prior to the switch to the second cell. The apparatus may also be configured to communicate with the UE via the second cell and using the TCI state.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a flowchart of a method of wireless communication.

FIG. 10 is a flowchart of a method of wireless communication.

FIG. 11 is a flowchart of a method of wireless communication.

FIG. 12 is a flowchart of a method of wireless communication.

DETAILED DESCRIPTION

Figure 1:
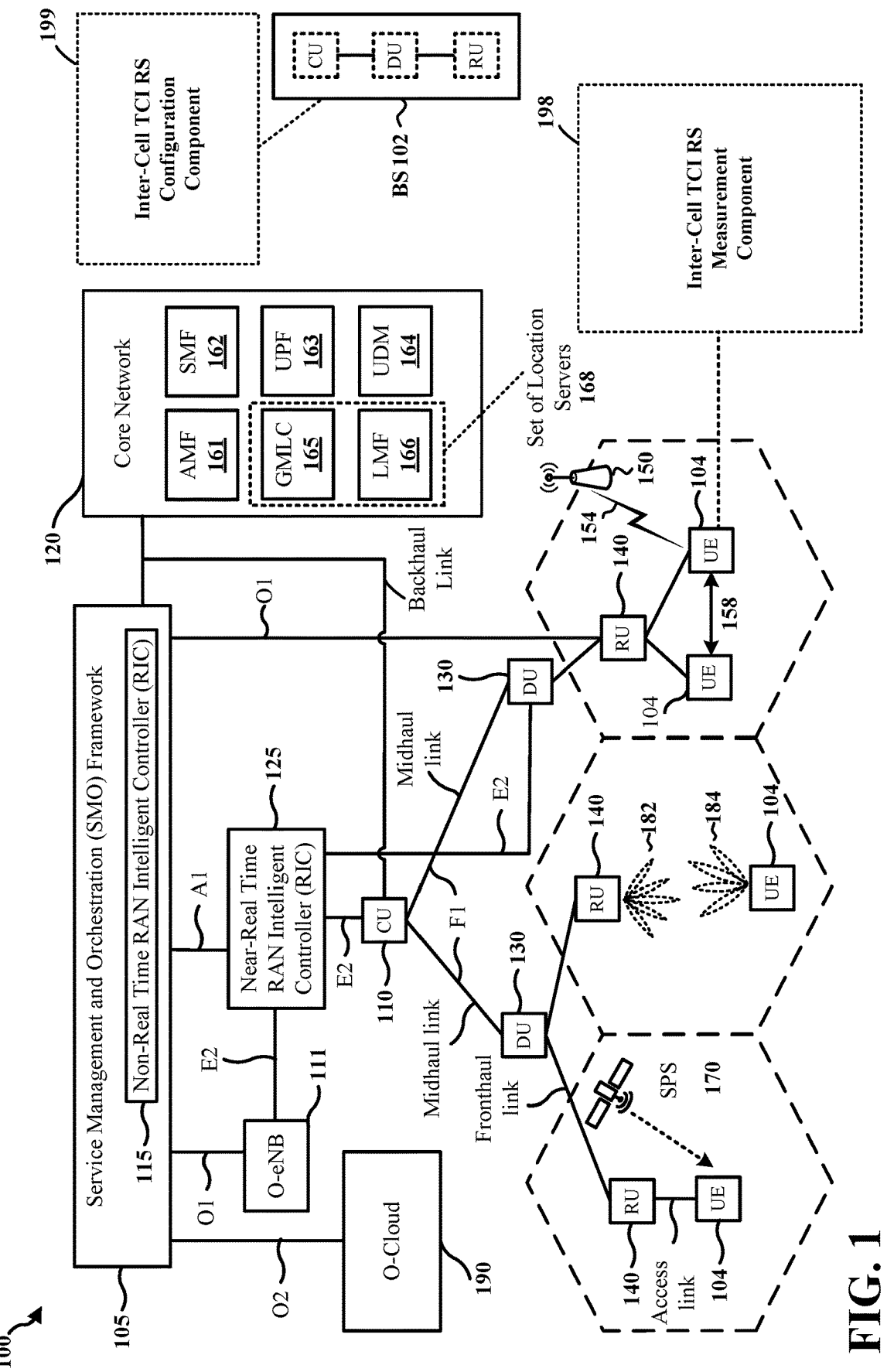
FIG. 1 is a diagram illustrating an example of a wireless communications system and an access network.

In some aspects of wireless communication, e.g., 5G NR, a UE in motion may experience multiple inter-cell handovers during which the UE served by a first cell switches to being served by a second cell. In some aspects, a UE may be configured to communicate with multiple candidate cells such that if a quality of communication with a current serving cell (e.g., a primary cell or a PCell) falls below a threshold quality, the UE may switch to be served by a second cell of the multiple cells (e.g., a secondary cell or SCell in a set of candidate SCells). In some aspects, during a switching operation a UE may perform additional beam training and/or management operations associated with a set of TCI states selected from a pool TCI states associated with the second cell. In some aspects, the additional beam training and/or management operations may be based on reference signals received after an indication to activate of the set of TCI states. Accordingly, communication via the second cell may involve additional latency associated with waiting for a next instance of a reference signal associated with an activated TCI state. The additional latency may be associated with a periodicity of the associated reference signal (e.g., 20 ms for a synchronization signal block (SSB)). A method and apparatus are provided to reduce latency associated with a switch from being served by a first cell to being served by a second cell.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an inter-cell TCI RS measurement (ITRM) component 198 that may be configured to receive, from a network node, a first indication for the UE to switch from being served by a first cell to being served by a second cell. The ITRM component 198 may further be configured to receive a second indication for the UE to use a TCI state, where the second indication is received with a timing after the first indication based on a relationship of the TCI state to one or more reference signals measured by the UE prior to receiving the first indication to switch to the second cell. The ITRM component 198 may also be configured to communicate with the network node via the second cell and using the TCI state. In certain aspects, the base station 102 may include an inter-cell TCI RS configuration (ITRC) component 199 that may be configured to indicate for a UE to switch from being served by a first cell to being served by a second cell. The ITRC component 199 may further be configured to indicate a TCI state for the UE to use with the second cell, where the indicating is performed with a timing based on a relationship of the TCI state to one or more reference signals measured by the UE prior to the switch to the second cell. The ITRC component 199 may also be configured to communicate with the UE via the second cell and using the TCI state. Although the following description may be focused on 5G NR, the concepts described herein may be applicable to other similar areas, such as LTE, LTE-A, CDMA, GSM, and other wireless technologies.

Figures 2A, 2B, 2C, 2D:
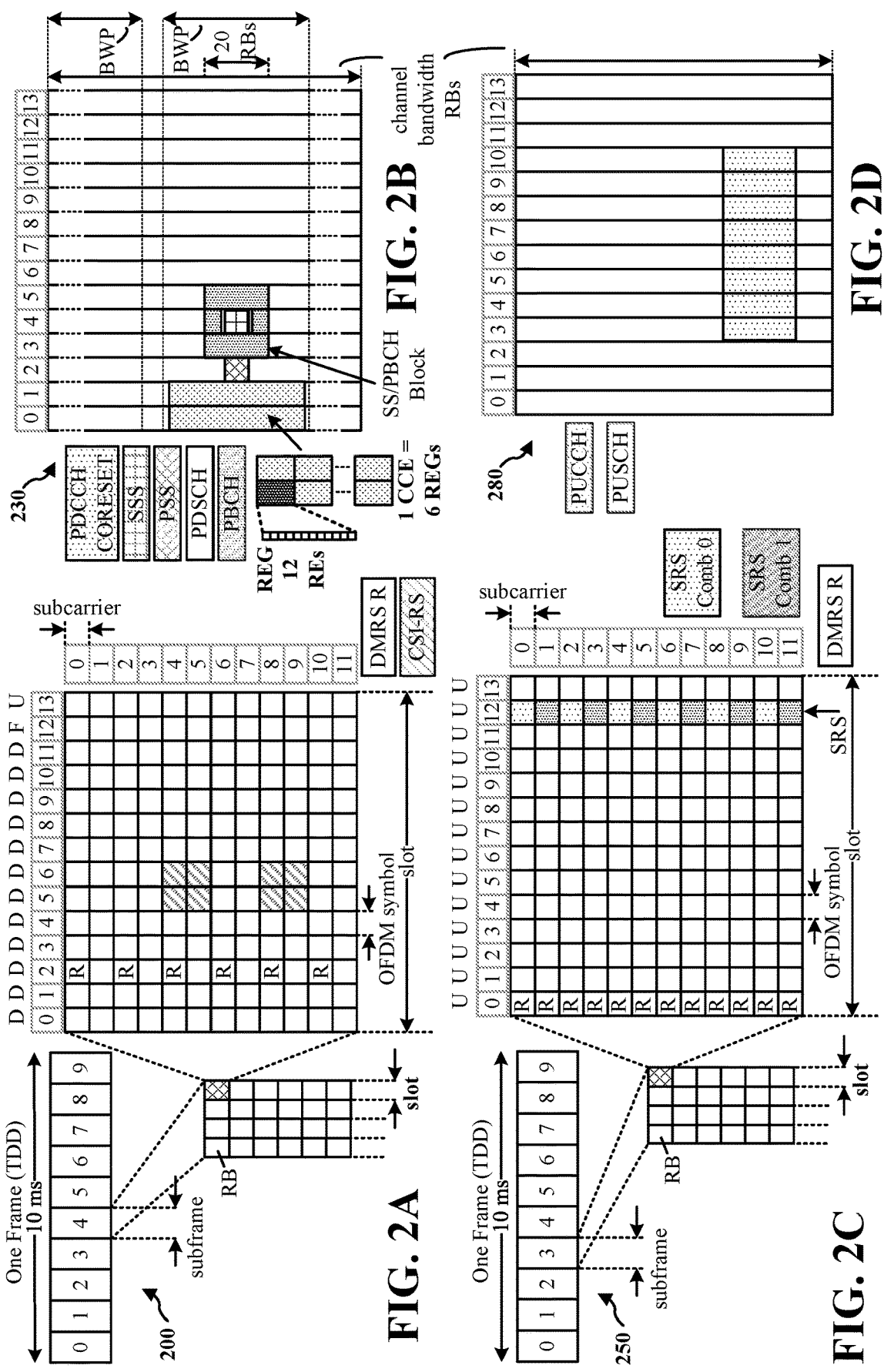
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS Δf = $2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
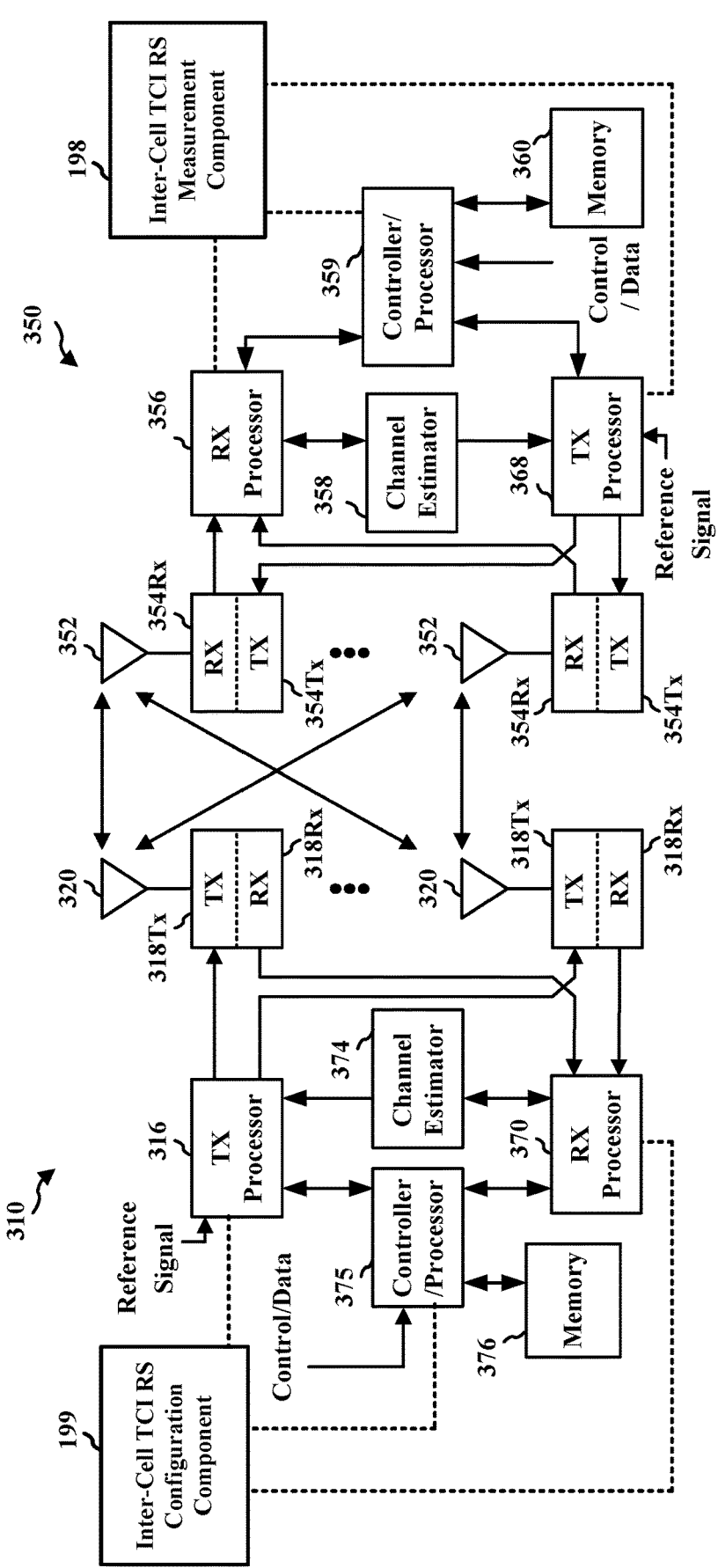
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antennas 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the ITRM component 198 of FIG. 1.

At least one of the TX processor 316, the RX processor 370, and the controller/processor 375 may be configured to perform aspects in connection with the ITRC component 199 of FIG. 1.

A network may communicate with a UE based on one or more beams (spatial filters). For example, a base station of the network may transmit a beamformed signal to a UE in one or more directions that correspond with one or more beams. The base station and the UE may perform beam training to determine the best receive and transmit directions for the base station and the UE.

In response to different conditions, beams may be switched. For example, a transmission configuration indication (TCI) state change may be transmitted by a base station so that the UE may switch to a new beam for the TCI state. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication. A TCI state may include quasi co-location (QCL) information that the UE can use to derive timing/frequency error and/or transmission/reception spatial filtering for transmitting/receiving a signal.

Different procedures for managing and controlling beams for wireless communication may be collectively referred to as "beam management." The process of selecting a beam to switch to for data channels or control channels may be referred to as "beam selection."

By way of example, a UE may encounter two types of mobility—cell-level mobility and beam-level mobility (which may be beam-based mobility). For cell-level mobility, a UE may experience an inter-cell handover. In some wireless communication systems, for beam-level mobility, as previously explained, switching of beams may occur within the same cell.

As an example, inter-cell beam management based on beam-based mobility may be facilitated by L1 and/or L2 signaling such as UE-dedicated channels/RSs which may be associated with a switch to a TRP with different PCI according to downlink control information (DCI) or medium access control (MAC) control element (MAC-CE) based unified TCI update. As used herein, such mobility may be referred to as L1/L2 mobility.

In some aspects, the network may configure a set of cells for L1/L2 mobility. The set of cells for L1/L2 mobility may be referred to as L1/L2 mobility configured cell set. A subset of the L1/L2 mobility configured cell set may be activated (e.g., with L1 or L2 control signaling) and may be referred to as an L1/L2 mobility activated cell set (which may also be referred to as an L1/L2 activated mobility cell set). The subset of cells in the L1/L2 mobility configured cell set that are not activated or that are indicated to be deactivated may be referred to as an L1/L2 mobility deactivated cell set or a deactivated L1/L2 mobility cell set. The L1/L2 mobility activated cell set may be a group of cells in the L1/L2 mobility configured cell set that are activated and may be readily used for data and control transfer. The L1/L2 mobility deactivated cell set (which may be an L1/L2 mobility candidate cell set) may be a group of cells in the configured set that are configured for the UE yet deactivated (e.g. not used for data/control transfer until activated) and may be activated by L1/L2 signaling. Once activated, a deactivated cell may be used for data and control transfer between a UE and a base station. The L1/L2 inter-cell mobility may reduce mobility latency. The configuration and maintenance of multiple candidate cells may allow for a quicker application of configurations for the candidate cells, and the activated set of cells may provide for dynamic switching among the candidate serving cells (e.g., including an SpCell and SCell) based on L1 or L2 signaling.

The procedures of L1/L2 based inter-cell mobility are applicable to many scenarios. These scenarios may include, but not limited to, standalone CA and NR-DC cases with serving cell changing within one CG, intra-DU cases and intra-CU inter-DU cases (applicable for standalone and CA, with no new RAN interface expected), intra-frequency and inter-frequency cases, FR1 and FR2 cases. In these scenarios, the source and target cells may be synchronized or non-synchronized.

For mobility management of the activated cell set, L1/L2 signaling may be used to activate/deactivate cells in the L1/L2 mobility configured cell set and to select beams within the activated cells (of the activated cell set). As the UE moves, cells from the L1/L2 mobility configured cell set may be deactivated and activated by L1/L2 signaling based on signal quality (e.g., based on measurements), loading, or the like. Example measurements may include cell coverage measurements represented by Radio Signal Received Power (RSRP), and quality represented by Radio Signal Received Quality (RSRQ), or other measurements that the UE performs on signals from the base station. In some aspects, the measurements may be L1 measurements such as one or more of an RSRP, an RSRQ, a received signal strength indicator (RSSI), or a signal to noise and interference ratio (SINR) measurement of various signals, such as an SSB, a PSS, an SSS, a broadcast channel (BCH), a DM-RS, CSI-RS, or the like.

In some aspects of wireless communication, e.g., 5G NR, a UE in motion may experience multiple inter-cell handovers during which the UE served by a first cell switches to being served by a second cell. In some aspects, a UE may be configured to communicate with multiple candidate cells such that if a quality of communication with a current serving cell (e.g., a primary cell or a PCell) of the multiple candidate cells falls below a threshold quality, the UE may switch to be served by a second cell of the multiple cells (e.g., a secondary cell or SCell in a set of candidate SCells). In some aspects, the configuration of the multiple candidate cells may be via layer 3 (L3) signaling such as RRC signaling. An indication to switch between being served by a first cell and a second cell, in some aspects, may be associated with layer 2 (L2) or layer 1 (L1) signaling. For example, an indication to switch between a first cell and a second cell may be received via one or more L2 signals (e.g., one or more MAC-CEs).

In some aspects, during a switching operation a UE may perform additional beam training and/or management (BM) operations associated with a set of TCI states selected from a pool TCI states associated with the second cell before using a TCI state in the set of TCI states for communication via the second cell. The set of TCI states may be indicated from a network node (e.g., a base station) via a MAC-CE (or other L2 signaling). In some aspects, the additional BM operations may be based on reference signals received after the indication to activate of the set of TCI states. Accordingly, communication via the second cell may involve additional latency associated with waiting for a next instance of a reference signal associated with an activated TCI state before transmitting an indication to use a TCI state for communication (e.g., via a DCI or other L1 signaling). The additional latency may be associated with a periodicity of the associated reference signal (e.g., 20 ms for a synchronization signal block (SSB)). A method and apparatus are provided to reduce latency associated with a switch from being served by a first cell to being served by a second cell.

In some aspects, the method and apparatus may make use of reference signals measured while the UE is served by the first cell (e.g., reference signals measured by the UE prior to receiving an indication to switch to the second cell). The method or apparatus, in some aspects, may indicate for the UE to maintain measurement information regarding one or more reference signals measured while being served by the first cell. In some aspects, the method or apparatus may maintain mapping information regarding relationships between reference signals and TCI states associated with the second cell to identify newly activated TCI states for which reference signals (e.g., CSI-RS or SSBs) have already been measured to reduce the additional latency introduced by waiting for reference signal transmission.

Figures 4A, 4B:
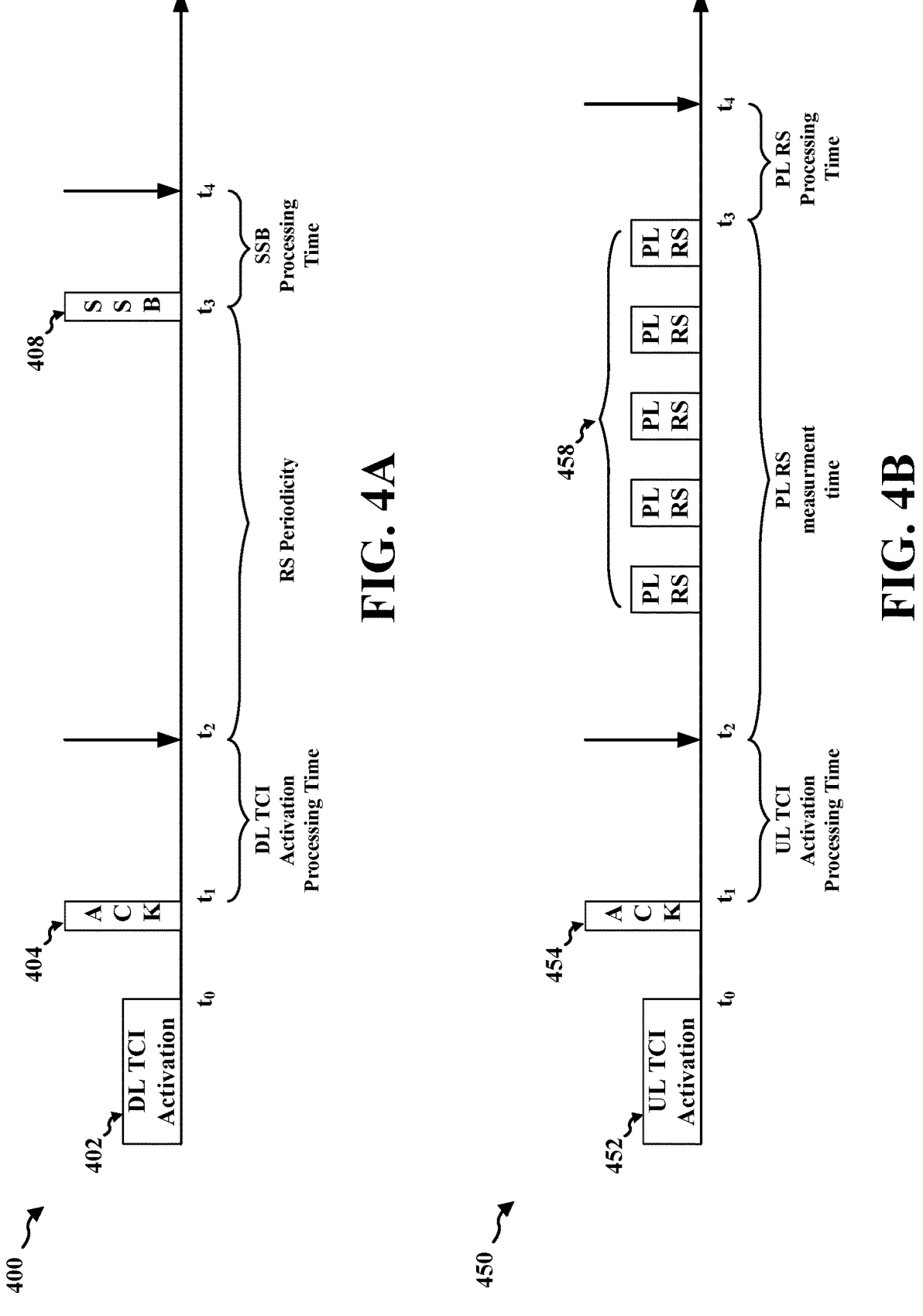
FIG. 4A is a diagram illustrating aspects of a timeline associated with TCI state activation.
FIG. 4B is a diagram illustrating aspects of a timeline associated with TCI state activation.

FIG. 4A is a diagram 400 illustrating aspects of a timeline associated with TCI state activation. FIG. 4A illustrates that a DL TCI state activation 402 may be transmitted by a network node and received by a UE at a time $t_0$. The UE may transmit a HARQ-ACK 404 at a time $t_1$. The TCI state activation 402 may be processed by a time $t_2$ that, in some aspects, may be an earliest time the UE is able to implement the TCI state (e.g., an earliest time the UE may begin to monitor and/or measure a RS associated with the TCI state). In order to be able to use the TCI for communication, the UE, in some aspects, measures at least one RS (e.g., SSB 408 at $t_3$) associated with the TCI state to derive timing/frequency error and/or transmission/reception spatial filtering for transmitting/receiving a signal using the TCI state. The at least one RS may be received, in some aspects, within a window that is as long as a period of the at least one RS which, in some instances, may lead to impractical latency (e.g., a latency so long that the TCI state is no longer useful at a time $t_4$ when the UE has completed processing the RS).

FIG. 4B is a diagram 450 illustrating aspects of a timeline associated with TCI state activation. FIG. 4B illustrates that a UL TCI state activation 452 may be transmitted by a network node and received by a UE at a time $t_0$. The UE may transmit a HARQ-ACK 454 at a time $t_1$. The TCI state activation 452 may be processed by a time $t_2$ that, in some aspects, may be an earliest time the UE is able to implement the TCI state (e.g., an earliest time the UE may begin to monitor and/or measure a RS associated with the TCI state). In order to be able to use the TCI for communication, the UE, in some aspects, measures a set of reference signals (e.g., PL reference signals 458 ending at time $t_3$) associated with the TCI state to derive timing/frequency error and/or transmission/reception spatial filtering for transmitting/receiving a signal using the TCI state. The set of reference signals may be received, in some aspects, within a window that is as long as a multiple of a period of the RS based on how many instances and/or repetitions of the RS are measured which, in some instances, may lead to impractical latency (e.g., a latency so long that the TCI state is no longer useful at a time $t_4$ when the UE has completed processing the set of reference signals).

Figure 5:
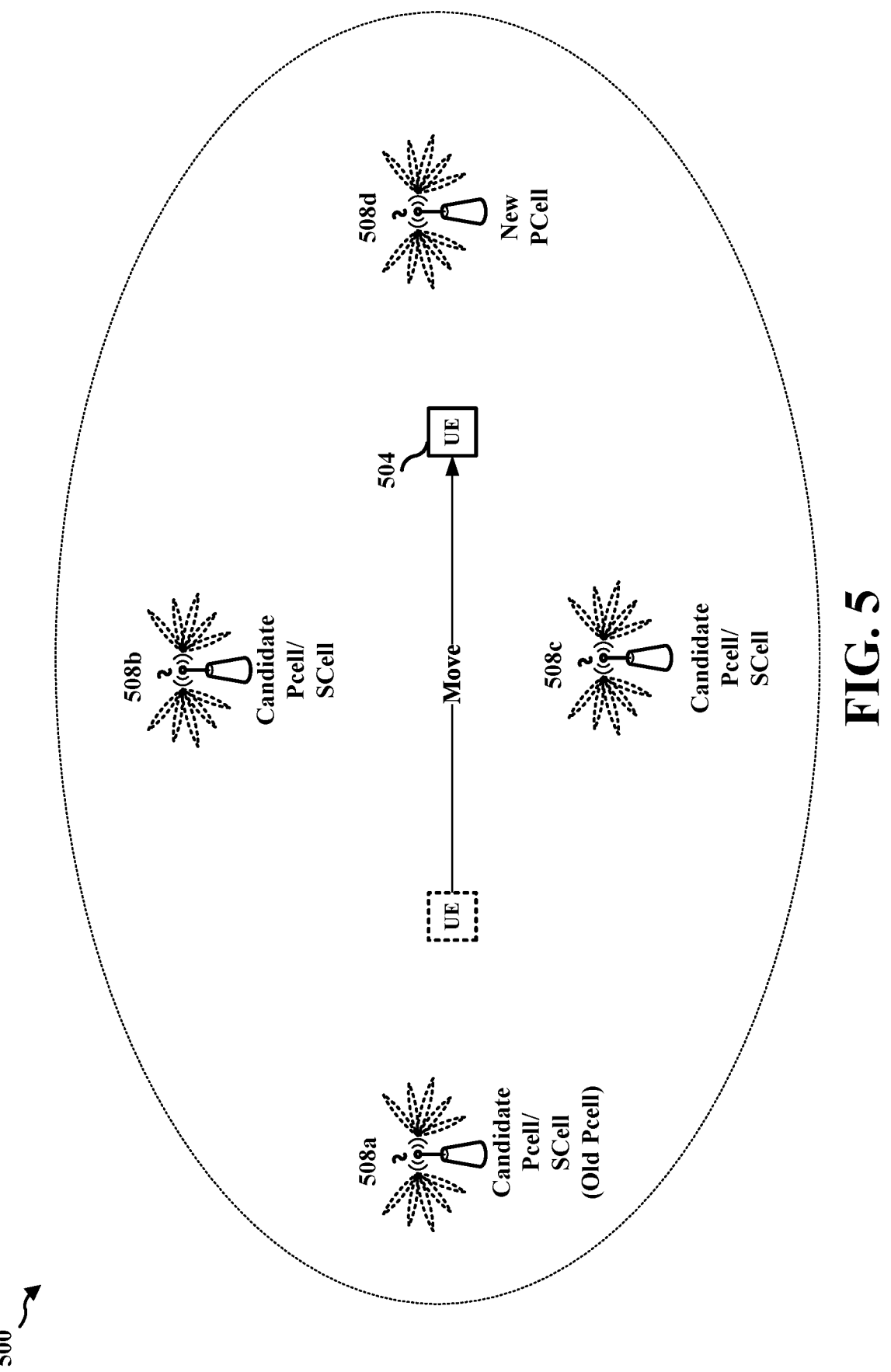
FIG. 5 is a diagram illustrating a UE experiencing a mobility event (e.g., a transition or handover) due to a move from a first location to a second location in accordance with some aspects of the disclosure.

FIG. 5 is a diagram 500 illustrating a UE 504 experiencing a mobility event (e.g., a transition or handover) due to a move from a first location to a second location in accordance with some aspects of the disclosure. The UE 504 may be configured to communicate with cell 508a as a primary (or serving) cell before the move and may be configured to communicate with cell 508d as a primary (or serving) cell after the move. The group of cells including cell 508a, cell 508b, cell 508c, and cell 508d, in some aspects, may be configured for carrier aggregation (CA) or dual connectivity (DC), while in other aspects, may be pre-configured PCell candidates in the absence of CA or DC.

Figure 6:
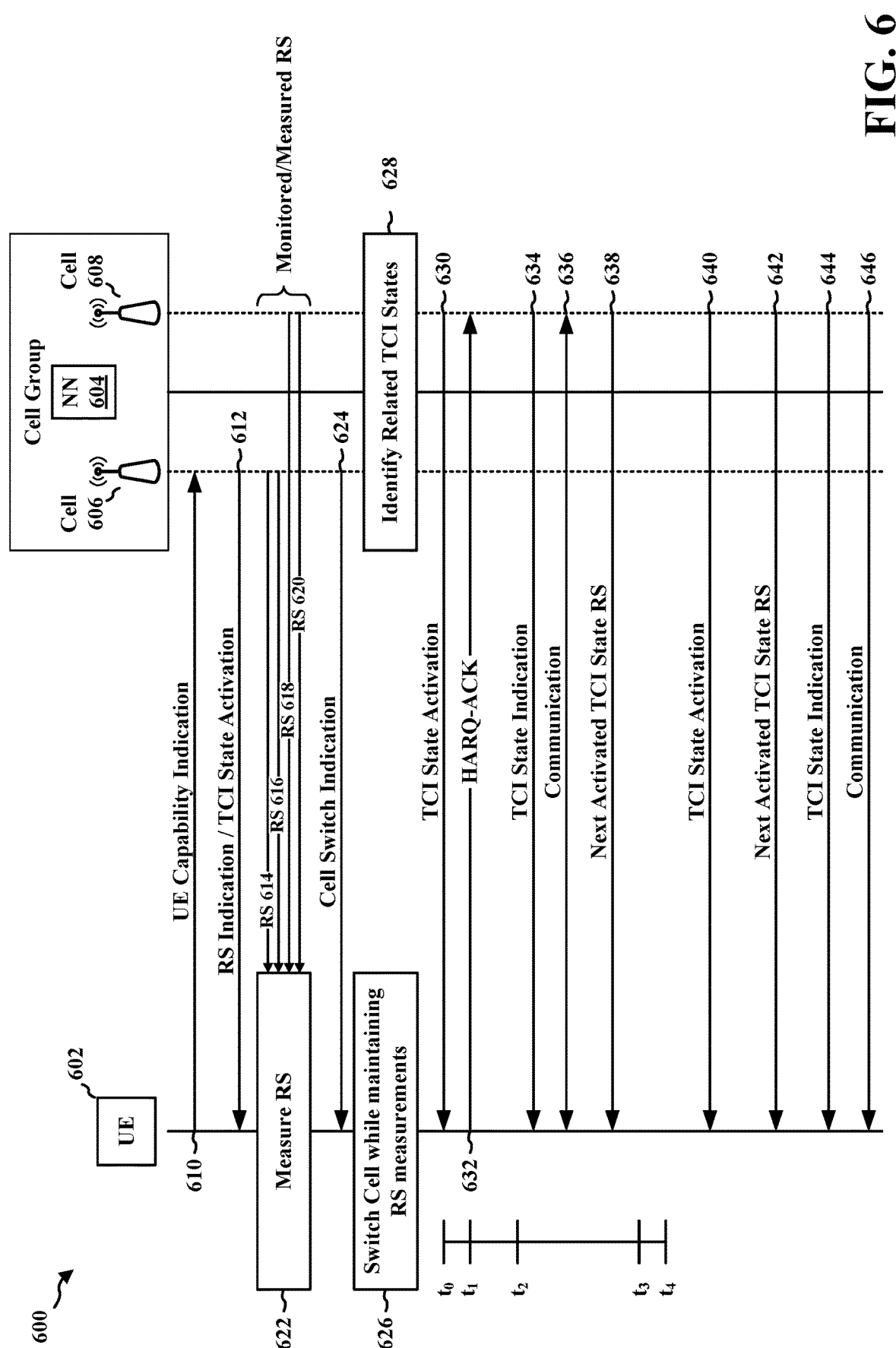
FIG. 6 is a call flow diagram illustrating a method of wireless communication for a UE to reduce latency during a switch from being served by a first cell to being served by a second cell in a cell group associated with network node in accordance with some aspects of the disclosure.

FIG. 6 is a call flow diagram 600 illustrating a method of wireless communication for a UE 602 to reduce latency during a switch from being served by a first cell 606 to being served by a second cell 608 in a cell group associated with network node 604 in accordance with some aspects of the disclosure. In some aspects, the UE 602 may transmit, and first cell 606 may receive, a UE capability indication 610. The first cell 606 may be a primary cell used to communicate control messages between the UE 602 and a network (or network node) associated with the cell group associated with network node 604. The UE capability indication 610, in some aspects, may relate to a buffer and/or memory size of the UE for storing RS measurements and/or information. Accordingly, the UE capability indication 610, in some aspects, indicates a capacity of the UE to store RS measurements. For example, the UE capability indication 610 may indicate (1) a total number of reference signals or (2) a number cells and a number of reference signals per cell for which measurements may be maintained and an indication of how long the information may be maintained. RS measurement information beyond the indicated capability (e.g., for RS measurements outside the indicated time period or for a RS measurement exceeding the total number indicated) may be assumed to be erased in a first in first out (FIFO) manner to capture new RS measurement information. The UE capability indication 610, in some aspects, may be included in a set of initial (or L3) configuration operations. A network node may then indicate parameters for RS measurement maintenance, such as a number of RS measurements to maintain and/or a time period for which to maintain RS measurements. In some aspects, the parameters for RS measurement maintenance may be known parameters based on the capacity indicated in the UE capability indication 610.

In some aspects, the first cell 606 may transmit, and UE 602 may receive, an indication 612 of a set of reference signals to monitor and/or TCI states to activate. The indication 612, in some aspects, may include an indication to maintain the associated RS measurement information as well as parameters such as the number of RS measurements to maintain or a time period for which to keep RS measurements. The indication 612, in some aspects, may be received via a MAC-CE. In some aspects, an activated TCI state is selected from a pool of TCI states associated with a serving cell (e.g., first cell 606). The TCI states in the pool of TCI states may be associated, e.g., may be quasi co-located (QCLed), with corresponding references signals. The QCL between the TCI state and the corresponding RS, in some aspects, may indicate that one or more of a frequency shift, a timing shift, or spatial characteristics associated with the corresponding reference signal may be applied to communication associated with the TCI state. In some aspects, the indication 612 may include a set of reference signals and/or TCI states associated with the second cell 608 and/or additional candidate cells (not shown) associated with the cell group associated with network node 604. The set of reference signals associated with the other cells of the cell group may be configured to be a same set of reference signals that is independent of the identity of the serving cell. To enable indicating reference signals or TCI states associated with the second cell 608, in some aspects, a PCI field may be associated with TCI states in the pool of TCI states or may be used to identify activated TCI states. In some aspects, the indication 612 may include an indication of a set of TCI states associated with UL transmissions and the associated reference signals may include a set of multiple references signals (or multiple instances of a same RS) used to measure a path loss (PL) associated with the TCI state.

Based on the indication 612 of the reference signals and/or TCI states to activate, the UE 602 may measure, at 622, a set of reference signals indicated in indication 612. The set of reference signals measured at 622 may include one or more of a first RS 614 transmitted by first cell 606, a second RS 616 transmitted by first cell 606, a third RS 618 transmitted by second cell 608, and a fourth RS 620 transmitted by second cell 608. In some aspects the set of reference signals measured at 622 may include additional reference signals (e.g., PL reference signals) transmitted by first cell 606, second cell 608, or other cells in the cell group associated with network node 604 that are not depicted for clarity.

The first cell 606 may transmit, and UE 602 may receive, an indication 624 for the UE 602 to switch from being served by the first cell 606 to being served by the second cell 608. Based on the indication 624, the UE 602 may then, at 626, switch from being served by the first cell 606 to the second cell 608 while maintaining RS measurements made while being served by the first cell 606. The network node 604, in some aspects, may identify, at 628, TCI states related to, associated with, or corresponding to, reference signals in the set of reference signals measured, at 622, by the UE 602. The identification, at 628, may be based on mapping information regarding relationships between reference signals and TCI states associated with a plurality of associated cells, including first cell 606 and second cell 608 maintained by network node 604.

The second cell 608 may then transmit, and UE 602 may receive, an indication 630 for the UE 602 to activate a first TCI state. The transmission of the indication 630, may be used to define a time to that defines a timeline associated with activating and/or using the first TCI state. The UE 602 may transmit, and second cell 608 may receive, a HARQ-ACK 632 at a time $t_1$ that may be processed by the second cell 608 by a time $t_2$. The time between $t_0$ and $t_2$, in some aspects, represents a minimum latency between a TCI state activation and an indication to use the TCI state for communication if timing, frequency, and spatial characteristics (e.g., QCL information) associated with the TCI state is known. The time between $t_2$ and $t_3$, in some aspects may represent a periodicity of the RS associated with the first TCI state and the time between $t_3$ and $t_4$ may represent a time to process a RS. Accordingly, the time between to and $t_4$ represents a maximum (or worst case) latency before an indication to use the first TCI state may be transmitted after an indication to activate the first TCI state. In some aspects, the minimum latency represented by the time between $t_0$ and $t_2$ may be much smaller (e.g., ~5 ms) than a maximum latency (e.g., ~25 ms) represented by the time between $t_0$ and $t_4$.

In some aspects, for the first TCI state, the network node 604 may identify, at 628, that the first TCI state is related to a RS measurement stored by the UE (e.g., a RS indicated in indication 612). Based on identifying, at 628, that the first TCI state is related to a RS measurement stored by the UE, the network node 604 may transmit (as early as time $t_2$), and UE 602 may receive, an indication 634 to use the first TCI state for communication with the second cell 608 before a next RS 638 associated with the first TCI state is transmitted by the second cell 608. Based on the indication 634 to use the first TCI state, the second cell 608 may transmit, and the UE 602 may receive, communication 636 using the first TCI. If the first TCI state is a UL TCI state, the UE 602 may transmit, and the second cell 608 may receive, communication 636 using the first TCI.

If the UE 602 does not maintain a RS measurement for a particular activated TCI state, the network node 604 may not indicate to use the particular TCI state until after a next RS associated with the particular TCI state is transmitted by the second cell 608 and received by the UE 602. For example, for a second TCI state, the second cell 608 may transmit, and the UE 602 may receive, an indication 640 to activate the second TCI state. Either before, or after, transmitting the indication 640, the network node 604 may identify and/or determine, at 628, that a measurement for a RS associated with the second TCI state is not maintained by the UE 602. Accordingly, the second cell 608 may wait to transmit an indication 644 to use the second TCI state until after transmitting a next RS 642 associated with the second TCI state and waiting for a processing time at the UE 602. Once the next RS 642 associated with the second TCI state has been transmitted and the processing time at the UE 602 has expired, the second cell 608 may transmit, and UE 602 may receive, the indication 644 to use the second TCI state for communication with the second cell 608. Based on the indication 644 to use the second TCI state, the second cell 608 may transmit, and the UE 602 may receive, communication 646 using the second TCI state.

Figure 7:
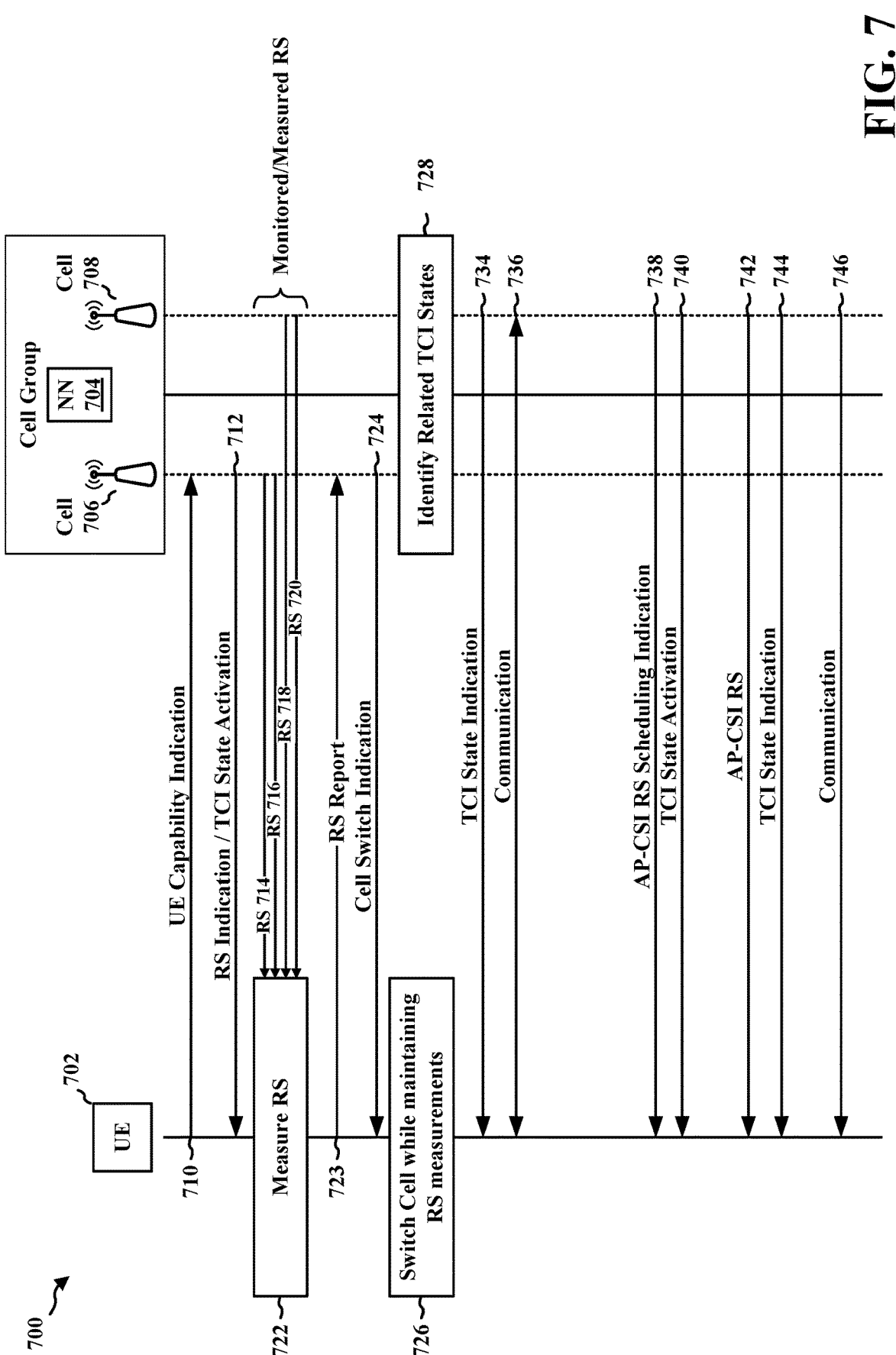
FIG. 7 is a call flow diagram illustrating a method of wireless communication for a UE to reduce latency during a switch from being served by a first cell to being served by a second cell in a cell group associated with network node in accordance with some aspects of the disclosure.

FIG. 7 is a call flow diagram 700 illustrating a method of wireless communication for a UE 702 to reduce latency during a switch from being served by a first cell 706 to being served by a second cell 708 in a cell group associated with network node 704 in accordance with some aspects of the disclosure. In some aspects, the UE 702 may transmit, and first cell 706 may receive, a UE capability indication 710. The first cell 706 may be a primary cell used to communicate control messages between the UE 702 and a network (or network node) associated with the cell group associated with network node 704. The UE capability indication 710, in some aspects, may relate to a buffer and/or memory size of the UE for storing RS measurements and/or information. Accordingly, the UE capability indication 710, in some aspects, indicates a capacity of the UE to store RS measurements. For example, the UE capability indication 710 may indicate (1) a total number of reference signals or (2) a number cells and a number of reference signals per cell for which measurements may be maintained and an indication of how long the information may be maintained. RS measurement information beyond the indicated capability (e.g., for RS measurements outside the indicated time period or for a RS measurement exceeding the total number indicated) may be assumed to be erased in a first in first out (FIFO) manner to capture new RS measurement information. The UE capability indication 710, in some aspects, may be included in a set of initial (or L3) configuration operations. A network node may then indicate parameters for RS measurement maintenance, such as a number of RS measurements to maintain and/or a time period for which to maintain RS measurements. In some aspects, the parameters for RS measurement maintenance may be known parameters based on the capacity indicated in the UE capability indication 710.

In some aspects, the first cell 706 may transmit, and UE 702 may receive, an indication 712 of a set of reference signals to monitor and/or TCI states to activate. The indication 712, in some aspects, may include an indication to maintain the associated RS measurement information as well as parameters such as the number of RS measurements to maintain or a time period for which to keep RS measurements. The indication 712, in some aspects, may be received via a MAC-CE. In some aspects, an activated TCI state is selected from a pool of TCI states associated with a serving cell (e.g., first cell 706). The TCI states in the pool of TCI states may be associated, e.g., may be QCLed, with corresponding references signals. The QCL between the TCI state and the corresponding RS, in some aspects, may indicate that one or more of a frequency shift, a timing shift, or spatial characteristics associated with the corresponding reference signal may be applied to communication associated with the TCI state. In some aspects, the indication 712 may include a set of reference signals and/or TCI states associated with the second cell 708 and/or additional candidate cells (not shown) associated with the cell group associated with network node 704. To enable indicating reference signals or TCI states associated with the second cell 708, in some aspects, a PCI field may be associated with TCI states in the pool of TCI states or may be used to identify activated TCI states.

Based on the indication 712 of the reference signals and/or TCI states to activate, the UE 702 may measure, at 722, a set of reference signals indicated in indication 712. The set of reference signals measured at 722 may include one or more of a first RS 714 transmitted by first cell 706, a second RS 716 transmitted by first cell 706, a third RS 718 transmitted by second cell 708, and a fourth RS 720 transmitted by second cell 708. In some aspects the set of reference signals measured at 722 may include additional reference signals transmitted by first cell 706, second cell 708, or other cells in the cell group associated with network node 704 that are not depicted for clarity. The UE 702 may transmit, and the first cell 706 may receive, a RS report 723 indicating a set of reference signals measured, at 722, by the UE 702.

The first cell 706 may transmit, and UE 702 may receive, an indication 724 for the UE 702 to switch from being served by the first cell 706 to being served by the second cell 708. Based on the indication 724, the UE 702 may then, at 726, switch from being served by the first cell 706 to the second cell 708 while maintaining RS measurements made while being served by the first cell 706. The network node 704, in some aspects, may identify, at 728, TCI states related to, associated with, or corresponding to, reference signals in the set of reference signals measured, at 722, by the UE 702. The identification, at 728, may be based on mapping information regarding relationships between reference signals and TCI states associated with a plurality of associated cells, including first cell 706 and second cell 708 maintained by network node 704.

In some aspects, in which a first TCI state associated with the second cell 708 is indicated in indication 712, the second cell 708 may transmit, and UE 702 may receive, an indication 734 to use the first TCI state for communication with the second cell 708 before a next RS associated with the first TCI state is transmitted by the second cell 708. In some aspects, for the first TCI state, the network node 704 may identify, at 728, that the first TCI state is related to a RS measurement stored by the UE (e.g., a RS indicated in indication 712). In some aspects, the indication 734 is transmitted based on identifying, at 728, that the first TCI state is related to a RS measurement stored by the UE. Based on the indication 734 to use the first TCI state, the second cell 708 may transmit, and the UE 702 may receive, communication 736 using the first TCI.

If the UE 702 does not maintain a RS measurement for a particular activated TCI state, the network node 704 may not indicate to use the particular TCI state until after a next RS associated with the particular TCI state is transmitted by the second cell 708 and received by the UE 702. However, in order to avoid latency associated with waiting for a next transmission of an RS associated with the particular TCI state, the second cell 708 may transmit an indication of an aperiodic (AP) CSI-RS at a time that is likely to be before a next RS transmission associated with the particular TCI state. For example, for a second TCI state, the second cell 708 may transmit, and the UE 702 may receive, an indication 738 of an AP CSI-RS and an indication 740 to activate the second TCI state. The second cell 708 may transmit, and the UE 702 may receive, AP CSI-RS 742. Based on a measurement of the AP CSI-RS, the UE 702 may acquire frequency, timing, and or spatial characteristics associated with the second TCI state. Once the next AP CSI-RS 742 associated with the second TCI state has been transmitted and the processing time at the UE 702 has expired, the second cell 708 may transmit, and UE 702 may receive, the indication 744 to use the second TCI state for communication with the second cell 708. Based on the indication 744 to use the second TCI state, the second cell 708 may transmit, and the UE 702 may receive, communication 746 using the second TCI state. By scheduling the AP CSI-RS 742, the second cell 708 may avoid at least a portion of an additional latency between TCI state activation and TCI state use associated with waiting for a RS transmission after a TCI state activation.

Figure 8:
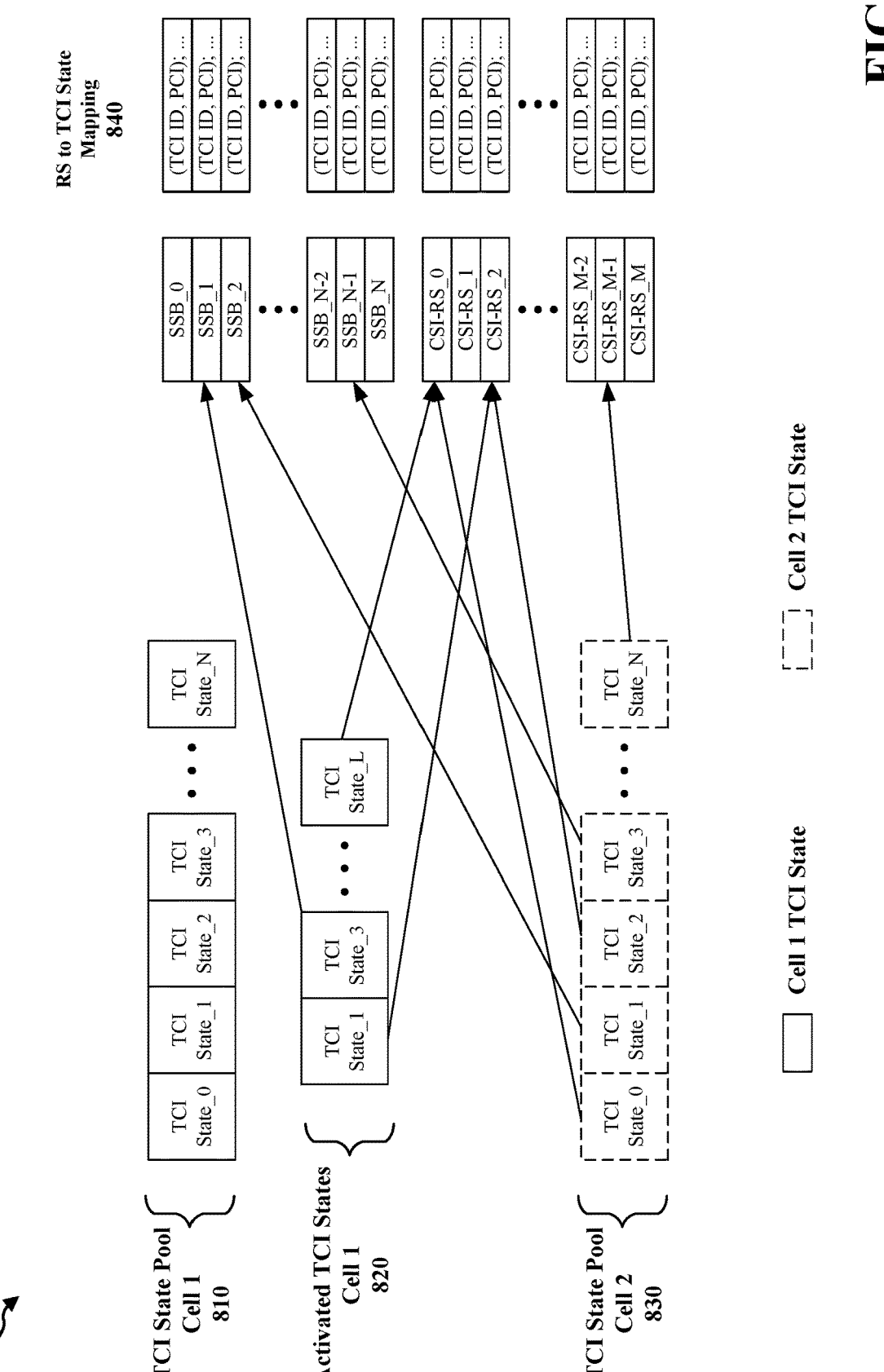
FIG. 8 is a diagram illustrating a mapping of reference signals to TCI states associated with different cells.

FIG. 8 is a diagram 800 illustrating a mapping of reference signals to TCI states associated with different cells. Each cell may be associated with a pool of TCI states that may be activated (e.g., TCI state pool 810 associated with a first cell and TCI state pool 830 associated with a second cell). For a first active cell, a set of TCI states 820 may be activated by a network node from the TCI state pool 810. As discussed above, the set of activated TCI states 820 may include TCI states from TCI state pool 830 but has not been illustrated for clarity.

Each TCI state in the set of activated TCI states 820 may be associated with at least one RS (e.g., at least one of SSB_0 to SSB_N or CSI-RS_0 to CSI-RS_M). A network node and/or a UE may maintain an RS-to-TCI state mapping 840. The RS-to-TCI state mapping 840 may indicate a set of TCI states associated with each of a set of reference signals and a cell associated with the TCI state (e.g., using a TCI ID, PCI pair). The RS-to-TCI state mapping 840 may be used by the network node to identify, and/or determine whether the UE maintains, a measured RS associated with an activated TCI state after a UE switches from being served by a first cell to being served by a second cell. The UE may use the RS-to-TCI state mapping 840 to identify the RS measurements to use to derive information relating to an activated TCI state.

In some aspects, one or more TCI states may be associated with a plurality of TRPs that may be capable of participating in a coherent joint transmission (CJT) operation in which a joint precoding may be applied across TRPs. In some aspects, each TRP may be associated with a TCI state and certain channels (e.g., PDSCH) may be associated with a CJT operation, e.g., may be CJT-enabled, while other channels (e.g., PDCCH) may have non-coherent transmissions from the multiple TRPs. A UE, in some aspects, may indicate a capacity to apply more than one TCI state for each channel (e.g., a PDSCH-CJT). In some aspects, the UE in the presence of a CJT operation may select a single TCI state from the multiple TCI states for the multiple TRPs to apply to one or more channels associated with the CJT operation. The single TCI state, in some aspects, may be signaled to the UE based on an indication that the UE does not have the capacity to apply more than one TCI state for each channel or when a UE is configured to provide a multi-TRP (mTRP) CJT CSI report. In some aspects, a TCI state may be signaled or indicated for each TRP. The UE may select a particular TCI state for each from the multiple TCI states for each channel (or at least for a channel to which CJT may be applied, e.g., a CJT-enabled channel) based on an implicit indication or an explicit indication. A TCI state may be indicated implicitly by ordering the TCI states associated with the multiple TRPs such that the first (or second) TCI state in the ordered list is identified as the unified, or joint, TCI state for at least CJT-enabled channels (e.g., PDSCH). Alternatively, an explicit indication may be provided by a network node via one or more of RRC signaling, a MAC-CE, or DCI. For example, a sTRP/mTRP one-time switch field may be re-used to dynamically indicate which TCI is applied to the PDSCH.

In some aspects, different types of QCL schemes may be defined for multiple TCI states applied to CJT-enabled (or active) channels (e.g., PDSCH-CJT_SchemeA, PDSCH-CJT_SchemeB, PDSCH-CJT_SchemeC, or PDSCH-CJT_SchemeD). As above, each TRP associated with a CJT operation may be associated with a TCI state and a particular QCL scheme may be identified to determine what information from each TCI state may be used for the channel (e.g., PDSCH) associated with the CJT operation. For example, a schemeA may indicate that all QCL information associated with each state may be used, while schemeB (or schemeC) may indicate that QCL-typeB (or typeC) information be ignored for all but one TCI state associated with the multiple TRPs because the coherent transmissions from the mTRPs should share timing and frequency characteristics indicated in the TypeB and typeC QCL information.

In some aspects, mTRP PUSCH may use up to two TCI states and 2 power control (PC) parameter settings. A PUSCH transmission may be scheduled and/or activated by a DCI format 0_1 or 0_2 to follow a spatial domain transmission filter(s) used for associated SRS resources indicated in the DCI format 0_1 or 0_2. The PC parameter associated with the PUSCH may be a PC parameter based on a TCI state associated with the SRS, or based on an independent TCI state (e.g., a PUSCH PC parameters may be associated with a first or second indicated TCI if the corresponding SRI is the first or second SRI). Alternatively, one TCI state may be defined as a default TCI state for PC parameters, e.g., based on a corresponding SRI order index. In some aspects, when the TCI state does not include PC parameters, sets of default PC parameters may be defined and/or provided (e.g., configured in BWP-UplinkDedicated) and the UE may apply one set of the default PC parameters based on one of a rule or based on signaling (e.g., using a bitmap in RRC signaling). For example, an indicated TCI of CORESET pool0 may have a first default PC parameter set applied while a TCI of CORESET pool1 may have a second default PC parameter set applied, or a k-th indicator TCI (not specifying PC parameters) may have a k-th default PC parameter set applied.

In some aspects, a system frame number (SFN) alignment or SSB based measurement timing configuration (SMTC) may be useful when performing inter cell RS measurements. A UE and/or network node may determine whether to perform an SFN alignment or SMTC. The factors for determining whether to perform the SFN alignment or the SMTC may include they type of DL RS used (e.g., SSB or CSI-RS), whether the DL RS is configured in the serving cell or a measured candidate cell, a measurement type (e.g., intra-frequency or inter-frequency), and whether a serving cell and a measured candidate cell are synchronized during a training operation for a DL transmission (e.g., whether deriveSSB_IndexFromCell is enabled or not and/or whether a reception timing is different by a time that is greater than a CP). A SFN alignment, in some aspects, may include configuring an sfn-offset (e.g., an offset time associated with the system frame number) or an sfn-ssb-offset (e.g., an offset time associated with an SSB and the system frame number).

FIG. 9 is a flowchart 900 of a method of wireless communication. The method may be performed by a UE (e.g., the UE 104, 602, or 702; the apparatus 1304). At 906, the UE may receive, from a network node, a first indication (e.g., a switch indication) for the UE to switch from being served by a first cell to being served by a second cell. For example, 906 may be performed by application processor 1306, cellular baseband processor 1324, transceiver(s) 1322, antenna(s) 1380, and/or ITRM component 198 of FIG. 13. In some aspects, the UE may have previously transmitted an indication of support for a capability at the UE to store measurement information regarding measurements of reference signals (e.g., a UE capability indication). The UE may receive an indication to measure at least one reference signal associated with the second cell or an indication to measure a set of reference signals associated with activated TCI states of the first cell while being served by the first cell. The UE may have additionally received an indication, e.g., a maintenance indication, to maintain a certain number of the RS measurements or to maintain RS measurements for a particular amount of time (e.g., a time period indication that may be included in a maintenance indication) based on the indication of support for the capability at the UE to store measurement information regarding RS measurements. The UE may also transmit a report that one or more reference signals were measured by the UE. For example, referring to FIGS. 6 and 7, the UE 602 or 702 may receive indication 624 or 724 and may have previously transmitted UE capability indication 610 or received indication 612.

Before, or after, the first indication received at 906, the UE may receive a third indication (e.g., a TCI state activation indication) for the UE to activate a TCI state associated with the second cell. Based on the indication for the UE to activate the TCI state, the UE, at 918, may receive a second indication (e.g., a TCI state indication) for the UE to use the TCI state (e.g., a TCI state indication may be preceded by a corresponding TCI state activation indication). For example, 918 may be performed by application processor 1306, cellular baseband processor 1324, transceiver(s) 1322, antenna(s) 1380, and/or ITRM component 198 of FIG. 13. In some aspects, a first time period between the switch indication and the TCI state indication may be based on a relationship of the TCI state to one or more reference signals measured by the UE prior to receiving the first indication to switch to the second cell. In some aspects, a minimum delay between receiving the third indication and receiving the second indication at 914 may be based on the relationship of the TCI state to the one or more reference signals. In some aspects, the first time period is independent of a time to receive a reference signal associated with the TCI state after receiving the second indication. The first time period, in some aspects, may be based on the report of the measured reference signals. For example, referring to FIGS. 6 and 7, the UE 602 or 702 may receive TCI indication 634 or 734 based on a previous TCI state activation indicated in indication 630 or 712.

In some aspects, the UE may maintain mapping information regarding relationships between reference signals and TCI states associated with the second cell. In some aspects, the mapping information regarding the relationships between the reference signals and TCI states associated with the second cell includes information regarding a quasi co-location of at least one reference signal and at least one TCI state associated with the second cell. The UE, in some aspects, may use the mapping information to determine the first time period.

At 920, the UE may communicate with the network node via the second cell and using the TCI state. For example, 920 may be performed by application processor 1306, cellular baseband processor 1324, transceiver(s) 1322, antenna(s) 1380, and/or ITRM component 198 of FIG. 13. The communication, in some aspects, may be UL or DL communication and the RS may be measured multiple times to evaluate a PL associated with a TCI state and/or may be measured at least once to derive timing/frequency error and/or transmission/reception spatial filtering for transmitting/receiving a signal. For example, referring to FIGS. 6 and 7, the UE 602 or 702 may transmit and/or receive communication 636 and/or 736.

In some aspects, the UE may receive a fourth indication (a second TCI state activation indication) for the UE to activate an additional (or second) TCI state, measure a reference signal associated with the additional TCI state to acquire timing and frequency information for the additional TCI state, and receive a fifth indication (a second TCI state indication) for the UE to use the additional TCI state. The fifth indication, in some aspects, may be received with a second time period between the second TCI state activation indication and the second TCI state indication may be based on a third timing associated with receiving the reference signal associated with the additional TCI state. In some aspects, the reference signal associated with the additional TCI state is an aperiodic reference signal, and the UE may receive a sixth indication (e.g., an AP RS timing indication) of the third timing of the reference signal associated with the additional TCI state. For example, referring to FIGS. 6 and 7, the UE 702 may receive the indication 738 and the UE 602 or 702 may receive indication 640 or 740 to activate a TCI state and measure a next RS 642 or a next AP CSI-RS 742 before receiving an indication at 644 or 744 to use the second TCI state and beginning communication 646 or 746 with the second cell using the second TCI state.

FIG. 10 is a flowchart 1000 of a method of wireless communication. The method may be performed by a UE (e.g., the UE 104, 602, or 702; the apparatus 1304). At 1002, the UE may transmit a UE capability indication indicating support for a capability at the UE to store measurement information regarding measurements of reference signals. For example, 1002 may be performed by application processor 1306, cellular baseband processor 1324, transceiver(s) 1322, antenna(s) 1380, and/or ITRM component 198 of FIG. 13. Referring to FIGS. 6 and 7, for example, the UE 602 or 702 may transmit UE capability indication 610 or 710.

At 1004, the UE may receive, while served by the first cell, an indication to measure at least one reference signal associated with the second cell. For example, 1004 may be performed by application processor 1306, cellular baseband processor 1324, transceiver(s) 1322, antenna(s) 1380, and/or ITRM component 198 of FIG. 13. In some aspects, the indication to measure at least one reference signal associated with the second cell, in some aspects, may be an indication to measure a set of reference signals associated with activated TCI states of the first cell while being served by the first cell. The UE may additionally receive an indication, e.g., a maintenance indication, to maintain a certain number of the RS measurements or to maintain RS measurements for a particular amount of time (e.g., a time period indication that may be included in a maintenance indication) based on the indication of support for the capability at the UE to store measurement information regarding RS measurements. Referring to FIGS. 6 and 7, for example, the UE 602 or 702 may receive the indication 612 or 712.

At 1006, the UE may receive, from a network node, a first indication (e.g., a switch indication) for the UE to switch from being served by a first cell to being served by a second cell. For example, 1006 may be performed by application processor 1306, cellular baseband processor 1324, transceiver(s) 1322, antenna(s) 1380, and/or ITRM component 198 of FIG. 13. The UE may also transmit a report that one or more reference signals were measured by the UE. For example, referring to FIGS. 6 and 7, the UE 602 or 702 may receive indication 624 or 724.

Before, or after, the first indication received at 1006, the UE, at 1008, may receive a third indication (e.g., a TCI state activation indication) for the UE to activate a TCI state associated with the second cell. For example, 1008 may be performed by application processor 1306, cellular baseband processor 1324, transceiver(s) 1322, antenna(s) 1380, and/or ITRM component 198 of FIG. 13. For example, referring to FIGS. 6 and 7, the UE 602 or 702 may receive indication 612 or 712.

At 1010, the UE may measure a reference signal associated with the activated TCI state (e.g., the TCI state activated by the indication received at 1008) to acquire timing and frequency information for the activated TCI state. In some aspects, the measured reference signal associated with the activated TCI state may be an AP RS and measuring the reference signal at 1010, may include receiving, at 1011, an AP RS timing indication of a timing of the reference signal associated with the activated TCI state. For example, 1010 and 1011 may be performed by application processor 1306, cellular baseband processor 1324, transceiver(s) 1322, antenna(s) 1380, and/or ITRM component 198 of FIG. 13. The activated TCI state, in some aspects, may be a TCI state associated with the first cell and/or the second cell. For example, referring to FIGS. 6 and 7, the UE 602 or 702 may measure one or more reference signals associated with at least one activated TCI state at 622 or 722 or similarly measure an AP CSI-RS based on indication 738 of an AP CSI-RS (e.g., a timing of the AP CSI-RS).

At 1012, the UE may maintain mapping information regarding relationships between reference signals and TCI states associated with the second cell. In some aspects, the mapping information regarding the relationships between the reference signals and TCI states associated with the second cell includes information regarding a quasi co-location of at least one reference signal and at least one TCI state associated with the second cell. For example, 1012 may be performed by application processor 1306, cellular baseband processor 1324, and/or ITRM component 198 of FIG. 13. In some aspects, the mapping may additionally, or alternatively, include a mapping between one or more TCI states associated with the first cell and one or more TCI states associated with the second cell. While described here, the information regarding relationships between reference signals and TCI states associated with the second cell may be maintained throughout the operations described in FIG. 10. For example, referring to FIGS. 6 to 8, the UE 602 or 702 may maintain an RS-to-TCI state mapping 840.

At 1014, the UE may maintain measurement information regarding the one or more reference signals. For example, 1014 may be performed by application processor 1306, cellular baseband processor 1324, and/or ITRM component 198 of FIG. 13. The measurement information regarding the one or more reference signals, in some aspects, may be maintained based on a known measurement configuration or a maintenance indication to maintain the measurement information. In some aspects, the UE may maintain the measurement information for a time period that is based on one or more of a known time period configuration or a maintenance time period indication. For example, referring to FIGS. 6 to 8, the UE 602 or 702 may maintain a RS-to-TCI state mapping 840.

At 1016, the UE may transmit a report indicating that the one or more reference signals were measured by the UE. For example, 1016 may be performed by application processor

Figure 13:
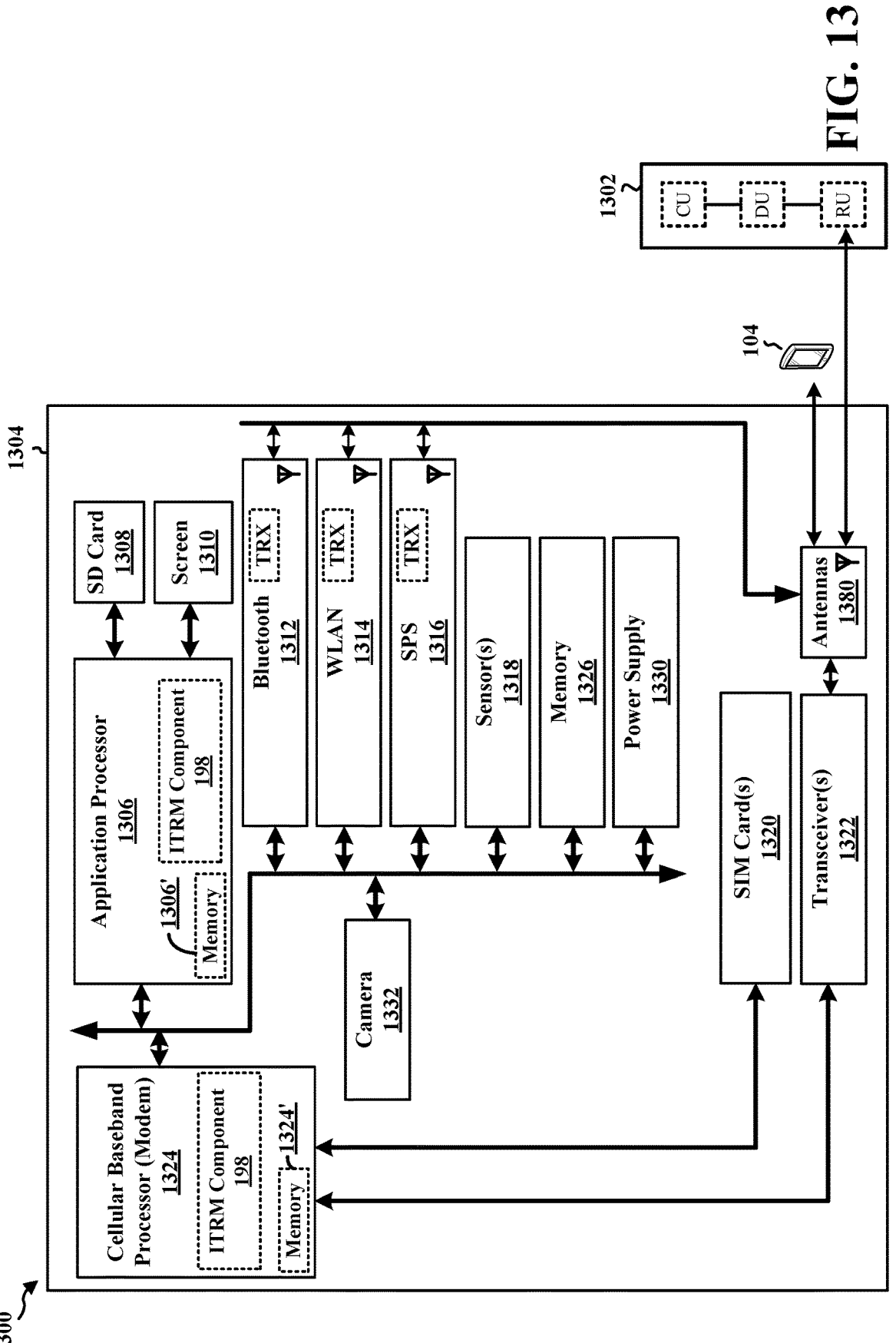
FIG. 13 is a diagram illustrating an example of a hardware implementation for an apparatus.

1306, cellular baseband processor 1324, transceiver(s) 1322, antenna(s) 1380, and/or ITRM component 198 of FIG. 13. Referring to FIG. 7, for example, the UE 702 may transmit a RS report 723.

Based on the indication for the UE to activate the TCI state, the UE, at 1018, may receive a second indication (e.g., a TCI state indication) for the UE to use the TCI state (e.g., a TCI state indication may be preceded by a corresponding TCI state activation indication). For example, 1018 may be performed by application processor 1306, cellular baseband processor 1324, transceiver(s) 1322, antenna(s) 1380, and/or ITRM component 198 of FIG. 13. In some aspects, a first time period between the switch indication and the TCI state indication may be based on a relationship of the TCI state to one or more reference signals measured by the UE prior to receiving the first indication to switch to the second cell. In some aspects, a minimum delay between receiving the TCI state activation indication and receiving the TCI state indication at 1018 may be based on the relationship of the TCI state to the one or more reference signals. In some aspects, the first time period is independent of a time to receive a reference signal associated with the TCI state after receiving the TCI state indication. The UE, in some aspects, may use the mapping information to determine the first time period. The first time period, in some aspects, may be based on the report of the measured reference signals transmitted at 1016. For example, referring to FIGS. 6 and 7, the UE 602 or 702 may receive TCI indication 634 or 734 based on a previous TCI state activation indicated in indication 630 or 712.

At 1020, the UE may communicate with the network node via the second cell and using the TCI state. For example, 1020 may be performed by application processor 1306, cellular baseband processor 1324, transceiver(s) 1322, antenna(s) 1380, and/or ITRM component 198 of FIG. 13. The communication, in some aspects, may be UL or DL communication and the RS may be measured multiple times to evaluate a PL associated with a TCI state and/or may be measured at least once to derive timing/frequency error and/or transmission/reception spatial filtering for transmitting/receiving a signal. For example, referring to FIGS. 6 and 7, the UE 602 or 702 may transmit and/or receive communication 636 and/or 736.

In some aspects, the UE may return to 1008 to receive a fourth indication (a second TCI state activation indication) for the UE to activate an additional (or second) TCI state, measure a reference signal associated with the additional TCI state to acquire timing and frequency information for the additional TCI state, and receive a fifth indication (a second TCI state indication) for the UE to use the additional TCI state. The fifth indication, in some aspects, may be received with a second time period between the second TCI state activation indication and the second TCI state indication may be based on a third timing associated with receiving the reference signal associated with the additional TCI state. In some aspects, the reference signal associated with the additional TCI state is an aperiodic reference signal, and the UE may receive a sixth indication (e.g., an AP RS timing indication) of the third timing of the reference signal associated with the additional TCI state. For example, referring to FIGS. 6 and 7, the UE 702 may receive the indication 738 and the UE 602 or 702 may receive indication 640 or 740 to activate a TCI state and measure a next RS 642 or a next AP CSI-RS 742 before receiving an indication at 644 or 744 to use the second TCI state and beginning communication 646 or 746 with the second cell using the second TCI state.

FIG. 11 is a flowchart 1100 of a method of wireless communication. The method may be performed by a base station (e.g., the base station 102; the cell 606, 608, 706, or 708; the network entity 1402). At 1114, the base station may indicate for a UE to switch from being served by a first cell to being served by a second cell. For example, 1114 may be performed by CU processor 1412, DU processor 1432, RU processor 1442, transceiver(s) 1446, antenna(s) 1480, and/or ITRC component 199 of FIG. 14. In some aspects, the indication may be performed via at least one of a MAC-CE or DCI. In some aspects, the base station may have previously received an indication of support for a capability at the UE to store measurement information regarding measurements of reference signals. The base station may transmit an indication to measure at least one reference signal associated with the second cell or an indication to measure a set of reference signals associated with activated TCI states of the first cell while being served by the first cell. The base station may have additionally transmitted an indication to maintain a certain number of the RS measurements or to maintain RS measurements for a particular amount of time based on the indication of support for the capability at the UE to store measurement information regarding RS measurements. The base station may also receive a report that one or more reference signals were measured by the UE. For example, referring to FIGS. 6 and 7, the network node 604 or 704 (via cell 606 or 608) may transmit indication 624 or 724 and may have previously received UE capability indication 610 or transmitted indication 612.

Before, or after, the first indication transmitted at 1114, the base station may transmit a third indication for the UE to activate a TCI state associated with the second cell. Based on the indication for the UE to activate the TCI state, the base station, at 1116, may indicate for the UE to use the TCI state. For example, 1116 may be performed by CU processor 1412, DU processor 1432, RU processor 1442, transceiver(s) 1446, antenna(s) 1480, and/or ITRC component 199 of FIG. 14. The indication to use the TCI state, in some aspects, may be performed via a DCI. In some aspects, the second indication may be transmitted with a timing after the first indication based on a relationship of the TCI state to one or more reference signals measured by the UE prior to receiving the first indication to switch to the second cell. In some aspects, a minimum delay between receiving the third indication and receiving the second indication at 1116 may be based on the relationship of the TCI state to the one or more reference signals. In some aspects, the timing is independent of a time to transmit a reference signal associated with the TCI state after transmitting the second indication. The timing, in some aspects, may be based on the report of the measured reference signals. For example, referring to FIGS. 6 and 7, the network node 604 or 704 via the second cell 608 may transmit TCI indication 634 or 734 based on a previous TCI state activation indicated in indication 630 or 712.

In some aspects, the base station may maintain mapping information regarding relationships between reference signals and TCI states associated with the second cell. In some aspects, the mapping information regarding the relationships between the reference signals and TCI states associated with the second cell comprises information regarding a quasi co-location of at least one reference signal and at least one TCI state associated with the second cell. The base station, in some aspects, may use the mapping information to determine the timing after the first indication.

At 1118, the UE may communicate with the network node via the second cell and using the TCI state. For example, 1118 may be performed by CU processor 1412, DU processor 1432, RU processor 1442, transceiver(s) 1446, antenna(s) 1480, and/or ITRC component 199 of FIG. 14. The communication, in some aspects, may be UL or DL communication and the RS may be measured multiple times to evaluate a PL associated with a TCI state and/or may be measured at least once to derive timing/frequency error and/or transmission/reception spatial filtering for transmitting/receiving a signal. For example, referring to FIGS. 6 and 7, the network node 604 or 704 may, via cell 608 or 708 transmit and/or receive communication 636 and/or 736.

In some aspects, the base station may transmit a fourth indication for the UE to activate an additional TCI state, measure a reference signal associated with the additional TCI state to acquire timing and frequency information for the additional TCI state, and transmit a fifth indication for the UE to use the additional TCI state. The fifth indication, in some aspects, may be transmitted with a second timing based on a third timing associated with receiving the reference signal associated with the additional TCI state. In some aspects, the reference signal associated with the additional TCI state is an aperiodic reference signal, and the UE may receive a sixth indication of the third timing of the reference signal associated with the additional TCI state. For example, referring to FIGS. 6 and 7, the network node 704 may transmit, via second cell 708, the indication 738 and the network node 704 may transmit, via second cell 708, indication 640 or 740 to activate a TCI state and measure a next RS 642 or a next AP CSI-RS 742 before receiving an indication at 644 or 744 to use the second TCI state and beginning communication 646 or 746 with the second cell using the second TCI state.

FIG. 12 is a flowchart 1200 of a method of wireless communication. The method may be performed by a base station (e.g., the base station 102; the cell 606, 608, 706, or 708; the network entity 1402). At 1202, the base station may receive a UE capability indication indicating a capability at the UE to maintain the measurement information regarding measurements of the one or more reference signals. For example, 1202 may be performed by CU processor 1412, DU processor 1432, RU processor 1442, transceiver(s) 1446, antenna(s) 1480, and/or ITRC component 199 of FIG. 14. Referring to FIGS. 6 and 7, for example, network node 604 or 704 (via cell 606 or 608) may receive UE capability indication 610 or 710.

At 1204, the base station may indicate, via a TCI state activation indication, for the UE to activate a TCI state. For example, 1204 may be performed by CU processor 1412, DU processor 1432, RU processor 1442, transceiver(s) 1446, antenna(s) 1480, and/or ITRC component 199 of FIG. 14. In some aspects, the TCI state activation indication may be for a TCI state that is associated with a second cell. The TCI state activation indication, in some aspects, may be transmitted in preparation for a potential handover from a current (first) serving cell to the second cell. For example, referring to FIGS. 6 and 7, the network node 604 or 704 (via cell 606 or 608) may transmit the indication 612 or 712 and/or an indication 630 or 740 for the UE to activate a TCI state.

At 1206, the base station may indicate, while the UE is served by the first cell, for the UE to measure the at least one reference signal associated with the second cell. For example, 1206 may be performed by CU processor 1412, DU processor 1432, RU processor 1442, transceiver(s) 1446, antenna(s) 1480, and/or ITRC component 199 of FIG. 14. In some aspects, the indication to measure at least one reference signal associated with the second cell, in some aspects, may be an indication to measure a set of reference signals associated with activated TCI states of the first cell and/or the second cell while being served by the first cell. In some aspects, the indication for the UE to measure the at least one reference signal associated with the second cell may be included (or implied) by the activation of the TCI state indicated at 1204. For example, referring to FIGS. 6 and 7, the network node 604 or 704 (via cell 606 or 608) may transmit the indication 612 or 712.

In association with indicating for the UE to measure the at least one reference signal at 1206, the base station may, in some aspects, additionally indicate, at 1207, for the UE to maintain measurement information regarding the one or more reference signals measured by the UE prior to the switch to the second cell and/or indicate, at 1208, a maintenance time period for the UE to maintain the measurement information. For example, 1207 and/or 1208 may be performed by CU processor 1412, DU processor 1432, RU processor 1442, transceiver(s) 1446, antenna(s) 1480, and/or ITRC component 199 of FIG. 14. In some aspects, the maintenance time period may be indicated using parameters such as the number of RS measurements to maintain or a time period for which to keep RS measurements. The indications associated with indicating for the UE to measure the at least one reference signal associated with the second cell at 1206, in some aspects, may be received via a MAC-CE. Referring to FIGS. 6 and 7, for example, the network node 604 or 704 (via cell 606 or 608) may transmit the indication 612 or 712.

At 1210, the base station may receive a report that the one or more reference signals were measured by the UE. For example, 1210 may be performed by CU processor 1412, DU processor 1432, RU processor 1442, transceiver(s) 1446, antenna(s) 1480, and/or ITRC component 199 of FIG. 14. In some aspects, the report may indicate that the measurement has been made (or that an equivalent measurement has been stored) and/or a report of the measurements (e.g., a one or more reported/measured powers). For example, referring to FIGS. 6 and 7, the network node 604 or 704 (via cell 606 or 608) may receive the report 723.

At 1212, the base station may maintain mapping information regarding relationships between reference signals and TCI states associated with the second cell. In some aspects, the mapping information regarding the relationships between the reference signals and TCI states associated with the second cell includes information regarding a quasi co-location of at least one reference signal and at least one TCI state associated with the second cell. For example, 1212 may be performed by CU processor 1412, DU processor 1432, RU processor 1442, and/or ITRC component 199 of FIG. 14. In some aspects, the mapping may additionally, or alternatively, include a mapping between one or more TCI states associated with the first cell and one or more TCI states associated with the second cell. While described here, the information regarding relationships between reference signals and TCI states associated with the second cell may be maintained throughout the operations described in FIG. 12. For example, referring to FIGS. 6 to 8, the network node 604 or 704 may maintain an RS-to-TCI state mapping 840.

At 1214, the base station may indicate for a UE to switch from being served by a first cell to being served by a second cell. For example, 1214 may be performed by CU processor 1412, DU processor 1432, RU processor 1442, transceiver(s) 1446, antenna(s) 1480, and/or ITRC component 199 of FIG. 14. In some aspects, the indication may be performed via at least one of a MAC-CE or DCI. For example, referring to FIGS. 6 and 7, the network node 604 or 704 (via cell 606 or 608) may transmit indication 624 or 724.

At 1216, the base station may indicate for the UE to use the TCI state. For example, 1216 may be performed by CU processor 1412, DU processor 1432, RU processor 1442, transceiver(s) 1446, antenna(s) 1480, and/or ITRC component 199 of FIG. 14. The indication for the UE to use the TCI state, in some aspects, may be performed via a DCI. In some aspects, the indication may be transmitted with a timing after the indication for the UE to switch from being served by the first cell to being served by the second cell based on a relationship of the TCI state to one or more reference signals measured by the UE prior to receiving the indication to switch to the second cell. In some aspects, a minimum delay between receiving the third indication and receiving the indication at 1216 may be based on the relationship of the TCI state to the one or more reference signals. In some aspects, the timing is independent of a time to transmit a reference signal associated with the TCI state after transmitting the second indication. The timing, in some aspects, may be based on the report of the measured reference signals. The base station, in some aspects, may use the mapping information maintained at 1212 to determine the timing after the first indication. For example, referring to FIGS. 6 and 7, the network node 604 or 704 via the second cell 608 may transmit TCI indication 634 or 734 based on a previous TCI state activation indicated in indication 630 or 712.

At 1218, the UE may communicate with the network node via the second cell and using the TCI state. For example, 1218 may be performed by CU processor 1412, DU processor 1432, RU processor 1442, transceiver(s) 1446, antenna(s) 1480, and/or ITRC component 199 of FIG. 14. The communication, in some aspects, may be UL or DL communication and the RS may be measured multiple times to evaluate a PL associated with a TCI state and/or may be measured at least once to derive timing/frequency error and/or transmission/reception spatial filtering for transmitting/receiving a signal. For example, referring to FIGS. 6 and 7, the network node 604 or 704 may, via cell 608 or 708 transmit and/or receive communication 636 and/or 736.

In some aspects, the base station may return to 1204 to indicate (e.g., via a fourth indication) for the UE to activate an additional TCI state, measure a reference signal associated with the additional TCI state to acquire timing and frequency information for the additional TCI state, and transmit a fifth indication for the UE to use the additional TCI state. The fifth indication, in some aspects, may be transmitted with a second timing based on a third timing associated with receiving the reference signal associated with the additional TCI state. In some aspects, the reference signal associated with the additional TCI state is an aperiodic reference signal, and the UE may receive a sixth indication of the third timing of the reference signal associated with the additional TCI state. For example, referring to FIGS. 6 and 7, the network node 704 may transmit, via second cell 708, the indication 738 and the network node 704 may transmit, via second cell 708, indication 640 or 740 to activate a TCI state and measure a next RS 642 or a next AP CSI-RS 742 before receiving an indication at 644 or 744 to use the second TCI state and beginning communication 646 or 746 with the second cell using the second TCI state.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize one or more antennas 1380 for communication. The cellular baseband processor(s) 1324 communicates through the transceiver(s) 1322 via the one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the ITRM component 198 is configured to receive, from a network node, a first indication for the UE to switch from being served by a first cell to being served by a second cell. The ITRM component 198 may further be configured to receive a second indication for the UE to use a TCI state, where the second indication is received with a timing after the first indication based on a relationship of the TCI state to one or more reference signals measured by the UE prior to receiving the first indication to switch to the second cell. The ITRM component 198 may also be configured to communicate with the network node via the second cell and using the TCI state. The ITRM component 198 may be within the cellular baseband processor 1324, the application processor 1306, or both the cellular baseband processor(s) 1324 and the application processor 1306. The ITRM component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor 1306, includes means for receiving, from a network node, a first indication for the UE to switch from being served by a first cell to being served by a second cell. The apparatus 1304, and in particular the cellular baseband processor(s) 1324 and/or the application processor 1306, may include means for receiving a second indication for the UE to use a TCI state. The apparatus 1304, and in particular the cellular baseband processor(s) 1324 and/or the application processor 1306, may include means for communicating with the network node via the second cell and using the TCI state. The apparatus 1304, and in particular the cellular baseband processor(s) 1324 and/or the application processor 1306, may include means for receiving a third indication for the UE to activate the TCI state. The apparatus 1304, and in particular the cellular baseband processor(s) 1324 and/or the application processor 1306, may include means for receiving a fourth indication for the UE to activate an additional TCI state. The apparatus 1304, and in particular the cellular baseband processor(s) 1324 and/or the application processor 1306, may include means for measuring a reference signal associated with the additional TCI state to acquire timing and frequency information for the additional TCI state. The apparatus 1304, and in particular the cellular baseband processor(s) 1324 and/or the application processor 1306, may include means for receiving a fifth indication for the UE to use the additional TCI state. The apparatus 1304, and in particular the cellular baseband processor(s) 1324 and/or the application processor 1306, may include means for receiving a sixth indication of the third timing of the reference signal associated with the additional TCI state. The apparatus 1304, and in particular the cellular baseband processor(s) 1324 and/or the application processor 1306, may include means for maintaining mapping information regarding relationships between reference signals and TCI states associated with the second cell. The apparatus 1304, and in particular the cellular baseband processor(s) 1324 and/or the application processor 1306, may include means for maintaining measurement information regarding the one or more reference signals based on at least one of a known measurement configuration or receiving an indication to maintain the measurement information. The apparatus 1304, and in particular the cellular baseband processor(s) 1324 and/or the application processor 1306, may include means for maintaining the measurement information for a time period that is based on one or more of a known time period configuration or receiving an indication of the time period. The apparatus 1304, and in particular the cellular baseband processor(s) 1324 and/or the application processor 1306, may include means for transmitting an indication of support for a capability at the UE to store measurement information regarding measurements of reference signals. The apparatus 1304, and in particular the cellular baseband processor(s) 1324 and/or the application processor 1306, may include means for receiving, while being served by the first cell, an indication to measure the at least one reference signal associated with the second cell. The apparatus 1304, and in particular the cellular baseband processor(s) 1324 and/or the application processor 1306, may include means for transmitting a third indication that the one or more reference signals were measured by the UE, wherein the timing is further based on the transmitting the third indication. The means may be the ITRM component 198 of the apparatus 1304 configured to perform the functions described above in relation to FIG. 9 and recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means or as described in relation to FIGS. 9 and 10.

Figure 14:
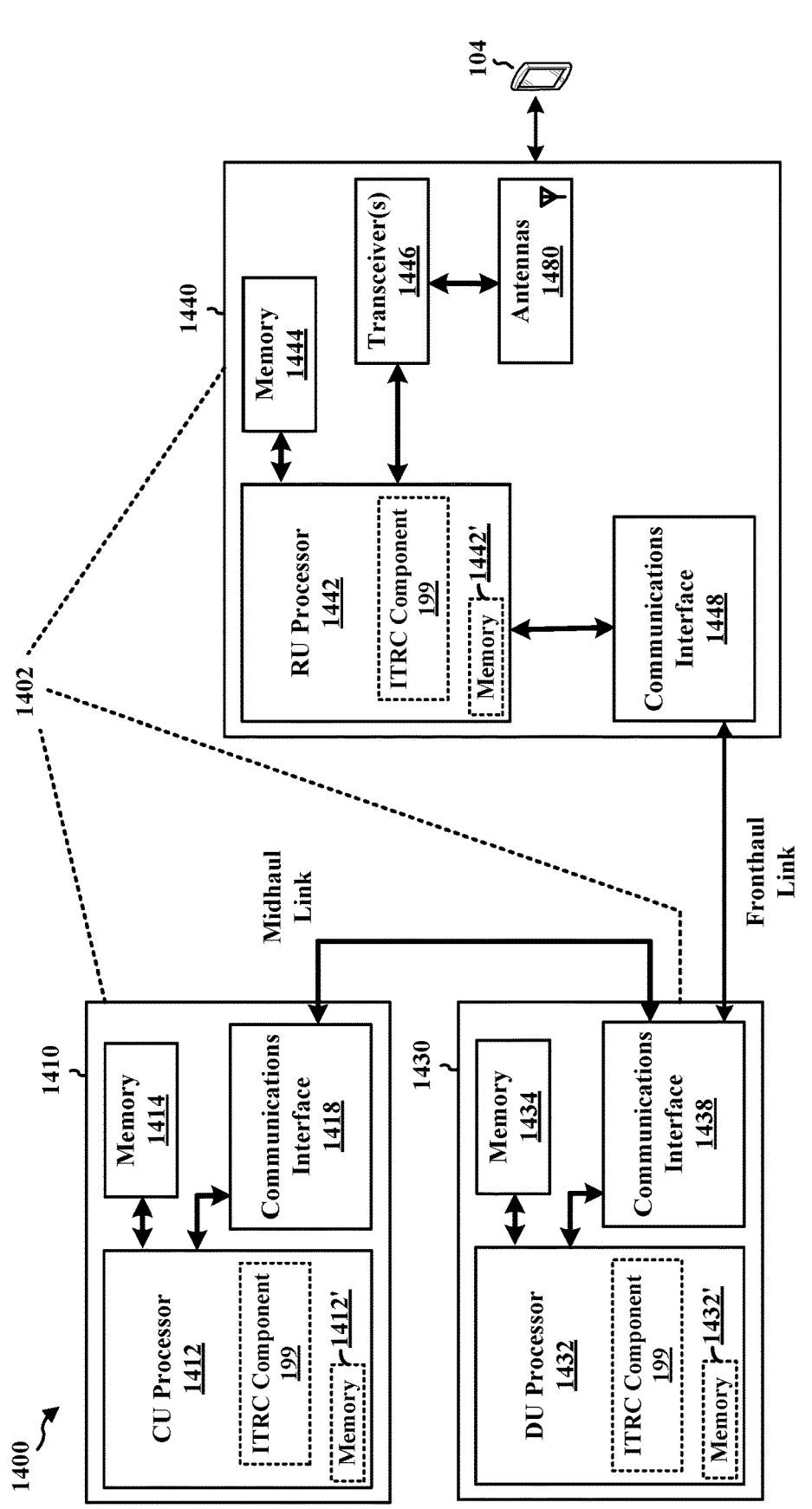
FIG. 14 is a diagram illustrating an example of a hardware implementation for a network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the ITRC component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor(s) 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor 1432. The DU processor(s) 1432 may include on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor(s) 1442 may include on-chip memory 1442'. In some aspects, the RU 1440 may further include additional memory modules 1444, one or more transceivers 1446, one or more antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the ITRC component 199 is configured to indicate for a UE to switch from being served by a first cell to being served by a second cell. The ITRC component 199 may further be configured to indicate a TCI state for the UE to use with the second cell, where the indicating is performed with a timing based on a relationship of the TCI state to one or more reference signals measured by the UE prior to the switch to the second cell. The ITRC component 199 may also be configured to communicate with the UE via the second cell and using the TCI state. The ITRC component 199 may be within one or more processors of one or more of the CU 1410, DU 1430, and the RU 1440. The ITRC component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 includes means for indicating for a UE to switch from being served by a first cell to being served by a second cell. The network entity 1402, in some aspects, includes means for indicating a transmission configuration indication (TCI) state for the UE to use with the second cell. The network entity 1402, in some aspects, includes means for communicating with the UE via the second cell and using the TCI state. The network entity 1402, in some aspects, includes means for indicating a TCI state activation for the UE to activate the TCI state. The network entity 1402, in some aspects, includes means for indicating a second TCI state activation for the UE to activate a second TCI state. The network entity 1402, in some aspects, includes means for indicating the second TCI state for the UE to use with the second cell. The network entity 1402, in some aspects, includes means for indicating the third timing of the reference signal associated with the second TCI state. The network entity 1402, in some aspects, includes means for maintaining mapping information regarding relationships between reference signals and TCI states associated with the second cell. The network entity 1402, in some aspects, includes means for indicating for the UE to maintain measurement information regarding the one or more reference signals measured by the UE prior to the switch to the second cell. The network entity 1402, in some aspects, includes means for indicating of a time period for the UE to maintain the measurement information. The network entity 1402, in some aspects, includes means for receiving an indication of a capability at the UE to maintain the measurement information regarding measurements of reference signals. The network entity 1402, in some aspects, includes means for indicating, while the UE is being served by the first cell, for the UE to measure the at least one reference signal associated with the second cell. The network entity 1402, in some aspects, includes means for receiving a report that the one or more reference signals were measured by the UE, wherein the timing is further based on receiving the report. The means may be the ITRC component 199 of the network entity 1402 configured to perform the functions described in relation to FIG. 10 and recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means or as described in relation to FIGS. 11 and 12.

In some aspects, during a switching operation a UE may perform additional beam training and/or management (BM) operations associated with a set of TCI states selected from a pool TCI states associated with the second cell before using a TCI state in the set of TCI states for communication via the second cell. The set of TCI states may be indicated from a network node (e.g., a base station) via a MAC-CE (or other L2 signaling). In some aspects, the additional BM operations may be based on reference signals received after the indication to activate of the set of TCI states. Accordingly, communication via the second cell may involve additional latency associated with waiting for a next instance of a reference signal associated with an activated TCI state before transmitting an indication to use a TCI state for communication (e.g., via a DCI or other L1 signaling). The additional latency may be associated with a periodicity of the associated reference signal (e.g., 20 ms for a synchronization signal block (SSB)). A method and apparatus are provided to reduce latency associated with a switch from being served by a first cell to being served by a second cell.

In some aspects, the method and apparatus may make use of reference signals measured while the UE is served by the first cell (e.g., reference signals measured by the UE prior to receiving an indication to switch to the second cell). The method or apparatus, in some aspects, may indicate for the UE to maintain measurement information regarding one or more reference signals measured while being served by the first cell. In some aspects, the method or apparatus may maintain mapping information regarding relationships between reference signals and TCI states associated with the second cell to identify newly activated TCI states for which reference signals (e.g., CSI-RS or SSBs) have already been measured to reduce the additional latency introduced by waiting for reference signal transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including receiving, from a network node, a switch indication for the UE to switch from being served by a first cell to being served by a second cell; receiving a TCI state indication that indicates a TCI state for the UE to use with the second cell, where a first time period between the switch indication and the TCI state indication is based on a relationship of the TCI state to one or more reference signals measured by the UE prior to receiving the switch indication; and communicating with the network node via the second cell and using the TCI state.

Aspect 2 is the method of aspect 1, where information relating to a time and frequency associated with the TCI state used for communication with the network node via the second cell are based on the one or more reference signals measured by the UE.

Aspect 3 is the method of any of aspects 1 and 2, further including receiving a TCI state activation indication for the UE to activate the TCI state, where the TCI state activation indication is received before the TCI state indication and one of before or after the switch indication, and where a minimum delay between the TCI state activation indication and the TCI state indication is based on the relationship of the TCI state to the one or more reference signals.

Aspect 4 is the method of aspect 3, where the first time period is independent of a time to receive a reference signal associated with the TCI state after receiving the TCI state indication.

Aspect 5 is the method of aspect 4, further including receiving a second additional TCI state activation indication for the UE to activate a second additional TCI state; measuring a second additional reference signal associated with the second TCI state to acquire timing and frequency information for the second TCI state; and receiving a second additional TCI state indication for the UE to use the second TCI state with the second cell, where a second time period between the second TCI state indication and the second TCI state activation indication is based on a third timing associated with the reference signal that is associated with the second TCI state.

Aspect 6 is the method of aspect 5, where the reference signal associated with the additional TCI state is an AP RS, the method further including receiving an AP RS timing indication of the third timing of the reference signal associated with the additional TCI state.

Aspect 7 is the method of any of aspects 1 to 6, further including maintaining mapping information regarding relationships between reference signals and TCI states associated with the second cell.

Aspect 8 is the method of aspect 7, where the mapping information regarding the relationships between the reference signals and TCI states associated with the second cell includes information regarding a quasi co-location of at least one reference signal and at least one TCI state associated with the second cell.

Aspect 9 is the method of any of aspects 7 or 8, further including maintaining measurement information regarding the one or more reference signals based on at least one of a known measurement configuration, or receiving a maintenance indication to maintain the measurement information.

Aspect 10 is the method of aspect 9, further including maintaining the measurement information for a time period that is based on one or more of a known time period configuration, or receiving a maintenance time period indication.

Aspect 11 is the method of any of aspects 1 to 10, further including transmitting a UE capability indication indicating support for a capability at the UE to store measurement information regarding measurements of reference signals.

Aspect 12 is the method of any of aspects 1 to 11, where the one or more reference signals are path loss reference signals and where information relating to a path loss associated with the TCI state used for the communicating with the network node via the second cell are based on the one or more reference signals measured by the UE.

Aspect 13 is the method of any of aspects 1 to 12, where the one or more reference signals include at least one reference signal associated with the second cell, the method further including receiving, while served by the first cell, an indication to measure the at least one reference signal associated with the second cell.

Aspect 14 is the method of any of aspects 1 to 13, further including transmitting a report indicating that the one or more reference signals were measured by the UE, where the first time period is further based on transmission of the report.

Aspect 15 is a method of wireless communication at a network node, indicating, via a switch indication, for a UE to switch from being served by a first cell to being served by a second cell, indicating, via a TCI state indication, a TCI state for the UE to use with the second cell, where a first time period between the switch indication and the TCI state indication is based on a relationship of the TCI state to one or more reference signals measured by the UE prior to the switch to the second cell, and communicating with the UE via the second cell and using the TCI state.

Aspect 16 is the method of aspect 15, where the switch indication is included in at least one of a MAC-CE or DCI.

Aspect 17 is the method of any of aspects 15 and 16, where the TCI state indication is included in a DCI.

Aspect 18 is the method of any of aspects 15 to 17, further including indicating, via a TCI state activation indication, for the UE to activate the TCI state, where the TCI state activation indication precedes the TCI state indication and one of precedes or follows the switch indication, and where a minimum delay between the TCI state activation indication and the TCI state indication is based on the relationship of the TCI state to the one or more reference signals.

Aspect 19 is the method of aspect 18, where the first time period is independent of a time to transmit a reference signal associated with the TCI state after indicating the TCI state activation.

Aspect 20 is the method of aspect 19, where the TCI state is a first TCI state further including indicating, via a second TCI state activation indication, for the UE to activate a second TCI state; indicating, via a second TCI state indication, a second TCI state for the UE to use with the second cell, where a second time period between the second TCI state activation indication and the second TCI state indication is based on a third timing associated with a transmission of a second reference signal associated with the second TCI state.

Aspect 21 is the method of aspect 20, where the reference signal associated with the second TCI state is an aperiodic reference signal, the method further including indicating the third timing of the reference signal associated with the second TCI state.

Aspect 22 is the method of any of aspects 15 to 21, further including maintaining mapping information regarding relationships between reference signals and TCI states associated with the second cell.

Aspect 23 is the method of aspect 22, where the mapping information regarding the relationships between the reference signals and the TCI states associated with the second cell comprises information regarding a quasi co-location of at least one reference signal and at least one TCI state associated with the second cell.

Aspect 24 is the method of any of aspects 22 or 23, further including indicating, via a maintenance indication, for the UE to maintain measurement information regarding the one or more reference signals measured by the UE prior to the switch to the second cell.

Aspect 25 is the method of aspect 24, further including indicating, via a maintenance time period indication, a time period for the UE to maintain the measurement information.

Aspect 26 is the method of aspect 25, further including receiving a UE capability indication indicating a capability at the UE to maintain the measurement information regarding measurements of the one or more reference signals, wherein at least one of the maintenance indication or the maintenance time period indication is based on the UE capability indication.

Aspect 27 is the method of any of aspects 15 to 26, where the one or more reference signals are path loss reference signals and where information relating to a path loss associated with the TCI state used for communication with the network node via the second cell are based on the one or more reference signals measured by the UE.

Aspect 28 is the method of any of aspects 15 to 27, where the one or more reference signals include at least one reference signal associated with the second cell, the method further including indicating, while the UE is served by the first cell, for the UE to measure the at least one reference signal associated with the second cell.

Aspect 29 is the method of any of aspects 15 to 28, further including receiving a report that the one or more reference signals were measured by the UE, where the first time period is further based on reception of the report.

Aspect 30 is an apparatus for wireless communication at a device including a memory and at least one processor coupled to the memory and, based at least in part on information stored in the memory, the at least one processor is configured to implement any of aspects 1 to 29.

Aspect 31 is the apparatus of aspect 30, further including a transceiver or an antenna coupled to the at least one processor.

Aspect 32 is an apparatus for wireless communication at a device including means for implementing any of aspects 1 to 29.

Aspect 33 is a computer-readable medium (e.g., a non-transitory computer-readable medium) storing computer executable code, where the code when executed by a processor causes the processor to implement any of aspects 1 to 29.

What is claimed is:

1. An apparatus for wireless communication at a user equipment (UE), comprising:
at least one memory; and
at least one processor coupled to the at least one memory and, based at least in part on stored information that is stored in the at least one memory, the at least one processor, individually or in any combination, is configured to:
receive, from a network node, a switch indication for the UE to switch from being served by a first cell to being served by a second cell;
receive a transmission configuration indication (TCI) state indication that indicates a TCI state for the UE to use with the second cell, wherein a first time period between the switch indication and the TCI state indication is based on a relationship of the TCI state to one or more reference signals measured by the UE prior to receiving the switch indication; and
communicate with the network node via the second cell using the TCI state.

2. The apparatus of claim 1, wherein information relating to a time and a frequency associated with the TCI state used for communication with the network node via the second cell are based on the one or more reference signals measured by the UE.

3. The apparatus of claim 1, wherein the at least one processor, individually or in any combination, is further configured to:
receive a TCI state activation indication for the UE to activate the TCI state, wherein the at least one processor is configured to receive the TCI state activation indication before the TCI state indication and one of before or after the switch indication, and wherein a minimum delay between the TCI state activation indication and the TCI state indication is based on the relationship of the TCI state to the one or more reference signals.

4. The apparatus of claim 3, wherein the first time period is independent of a time to receive a reference signal associated with the TCI state after receiving the TCI state indication.

5. The apparatus of claim 4, wherein the at least one processor, individually or in any combination, is further configured to:
receive a second TCI state activation indication for the UE to activate a second TCI state;
measure a second reference signal associated with the second TCI state to acquire timing and frequency information for the second TCI state; and
receive a second TCI state indication for the UE to use the second TCI state with the second cell, wherein a second time period between the second TCI state indication and the TCI state activation indication is based on a third timing associated with the reference signal that is associated with the second TCI state.

6. The apparatus of claim 5, wherein the reference signal associated with the second TCI state is an aperiodic (AP) reference signal (RS), wherein the at least one processor, individually or in any combination, is further configured to:
receive an AP RS timing indication of the third timing of the reference signal associated with the second TCI state.

7. The apparatus of claim 1, wherein the at least one processor, individually or in any combination, is further configured to:
maintain mapping information regarding relationships between reference signals and TCI states associated with the second cell.

8. The apparatus of claim 7, wherein the mapping information regarding the relationships between the reference signals and the TCI states associated with the second cell comprises information regarding a quasi co-location of at least one reference signal and at least one TCI state associated with the second cell.

9. The apparatus of claim 7, wherein the at least one processor, individually or in any combination, is further configured to maintain measurement information regarding the one or more reference signals based on at least one of:
a known measurement configuration; or
a maintenance indication to maintain the measurement information.

10. The apparatus of claim 9, wherein the at least one processor, individually or in any combination, is configured to maintain the measurement information for a time period that is based on one or more of:
a known time period configuration; or
a maintenance time period indication.

11. The apparatus of claim 1, wherein the at least one processor, individually or in any combination, is further configured to:
transmit a UE capability indication indicating support for a capability at the UE to store measurement information regarding measurements of reference signals.

12. The apparatus of claim 1, wherein the one or more reference signals are path loss reference signals and wherein information relating to a path loss associated with the TCI state used for communication with the network node via the second cell are based on the one or more reference signals measured by the UE.

13. The apparatus of claim 1 wherein the one or more reference signals comprise at least one reference signal associated with the second cell, wherein the at least one processor, individually or in any combination, is further configured to:

receive, while served by the first cell, an indication to measure the at least one reference signal associated with the second cell.

14. The apparatus of claim 1, wherein the at least one processor, individually or in any combination, is further configured to:

transmit a report indicating that the one or more reference signals were measured by the UE, wherein the first time period is further based on transmission of the report.

15. An apparatus for wireless communication at a network node, comprising:

at least one memory; and at least one processor coupled to the at least one memory and, based at least in part on stored information that is stored in the at least one memory, the at least one processor, individually or in any combination, is configured to:

indicate, via a switch indication, for a user equipment (UE) to perform a switch from being served by a first cell to being served by a second cell;

indicate, via a transmission configuration indication (TCI) state indication, a TCI state for the UE to use with the second cell, wherein a first time period between the switch indication and the TCI state indication is based on a relationship of the TCI state to one or more reference signals measured by the UE prior to perform a to the second cell; and communicate with the UE via the second cell using the TCI state.

16. The apparatus of claim 15, wherein the at least one processor, individually or in any combination, is further configured to include the switch indication in at least one of a medium access control (MAC) control element (MAC-CE) or downlink control information (DCI).

17. The apparatus of claim 15, wherein the at least one processor, individually or in any combination, is further configured to include the TCI state indication in a downlink control information (DCI).

18. The apparatus of claim 15, wherein the at least one processor, individually or in any combination, is further configured to:

indicate, via a TCI state activation indication, for the UE to activate the TCI state, wherein the at least one processor, individually or in any combination, is configured to indicate the TCI state activation indication before the TCI state indication and one of before or after the switch indication, and wherein a minimum delay between the TCI state activation indication and the TCI state indication is based on the relationship of the TCI state to the one or more reference signals.

19. The apparatus of claim 18, wherein the first time period is independent of a time to transmit a reference signal associated with the TCI state after the TCI state activation indication.

20. The apparatus of claim 19, wherein the TCI state is a first TCI state, wherein the at least one processor, individually or in any combination, is further configured to:

indicate, via a second TCI state activation indication, for the UE to activate a second TCI state; and indicate, via a second TCI state indication, the second TCI state for the UE to use with the second cell, wherein a second time period between the second TCI state activation indication and the second TCI state indication is based on a third timing associated with a transmission of a second reference signal associated with the second TCI state.

21. The apparatus of claim 20, wherein the reference signal associated with the second TCI state is an aperiodic reference signal, wherein the at least one processor, individually or in any combination, is further configured to:

indicate the third timing of the reference signal associated with the second TCI state.

22. The apparatus of claim 15, wherein the at least one processor, individually or in any combination, is further configured to:

maintain mapping information regarding relationships between reference signals and TCI states associated with the second cell.

23. The apparatus of claim 22, wherein the mapping information regarding the relationships between the reference signals and the TCI states associated with the second cell comprises information regarding a quasi co-location of at least one reference signal and at least one TCI state associated with the second cell.

24. The apparatus of claim 22, wherein the at least one processor, individually or in any combination, is further configured to:

indicate for the UE to maintain measurement information regarding the one or more reference signals measured by the UE prior to the switch to the second cell; and indicate a maintenance time period for the UE to maintain the measurement information.

25. The apparatus of claim 24, wherein the at least one processor, individually or in any combination, is further configured to:

receive a UE capability indication indicating a capability at the UE to maintain the measurement information regarding measurements of the one or more reference signals, and at least one of (1) indicate for the UE to maintain the measurement information or (2) indicate the maintenance time period based on the UE capability indication.

26. The apparatus of claim 15, wherein the one or more reference signals are path loss reference signals and wherein information relating to a path loss associated with the TCI state used for communication with the network node via the second cell are based on the one or more reference signals measured by the UE.

27. The apparatus of claim 15 wherein the one or more reference signals comprise at least one reference signal associated with the second cell, wherein the at least one processor, individually or in any combination, is further configured to:

indicate, while the UE is served by the first cell, for the UE to measure the at least one reference signal associated with the second cell.

28. The apparatus of claim 15, wherein the at least one processor, individually or in any combination, is further configured to:

receive a report that the one or more reference signals were measured by the UE, wherein the first time period is further based on reception of the report.

29. A method of wireless communication at a user equipment (UE), comprising:

receiving, from a network node, a switch indication for the UE to switch from being served by a first cell to being served by a second cell;

receiving a transmission configuration indication (TCI) state indication that indicates a TCI state for the UE to use with the second cell, wherein a first time period between the switch indication and the TCI state indication is based on a relationship of the TCI state to one or more reference signals measured by the UE prior to receiving the switch indication; and communicating with the network node via the second cell and using the TCI state.

30. A method of wireless communication at a network node, comprising:

indicating, via a switch indication, for a UE to perform a switch from being served by a first cell to being served by a second cell;

indicating, via a transmission configuration indication (TCI) state indication, a TCI state for the UE to use with the second cell, wherein a first time period between the switch indication and the TCI state indication is based on a relationship of the TCI state to one or more reference signals measured by the UE prior to the switch to the second cell; and communicating with the UE via the second cell and using the TCI state.

* * * * *